（12） United States Patent
Crowley et al.

(10) Patent No.: US 9,922,386 B2
(45) Date of Patent: *Mar. 20, 2018

(54) SYSTEMS AND METHODS FOR FACILITATING REMOTE SECURITY THREAT DETECTION

(71) Applicant: MICHAEL STAPLETON ASSOCIATES, LTD., New York, NY (US)

(72) Inventors: Raymond Crowley, North Haven, CT (US); Michael Wynn, Stratford, CT (US); Joe Atherall, Yorktown Heights, NY (US); Matthew Ryan Dimmick, Manahawkin, NJ (US)

(73) Assignee: Michael Stapleton Associates, LTD, New York, NY (US)

( * ) Notice: Subject to any disclaimer, the term of this patent is extended or adjusted under 35 U.S.C. 154(b) by 156 days.

This patent is subject to a terminal disclaimer.

(21) Appl. No.: 15/073,470

(22) Filed: Mar. 17, 2016

(65) Prior Publication Data

US 2016/0196628 A1 Jul. 7, 2016

Related U.S. Application Data

(63) Continuation-in-part of application No. 14/567,312, filed on Dec. 11, 2014, now Pat. No. 9,306,970, (Continued)

(51) Int. Cl.
H04L 29/06 (2006.01)
G06Q 50/26 (2012.01)
(52) U.S. Cl.
CPC ....... G06Q 50/265 (2013.01); H04L 63/1408 (2013.01); H04L 63/1441 (2013.01); H04L 63/20 (2013.01)

(58) Field of Classification Search
CPC ..... H04L 63/1441; H04L 29/06; H04L 67/12; H04L 67/02; H04L 69/329; G06F 15/16; G06Q 10/02
(Continued)

(56) References Cited

U.S. PATENT DOCUMENTS 5,182,764 A 1/1993 Peschmann et al.
5,367,552 A * 11/1994 Peschmann ..................... 378/57
(Continued)

FOREIGN PATENT DOCUMENTS

WO 2004049195 A3 2/2005

OTHER PUBLICATIONS

L-3 Communications, Company Profile [online], [retrieved Aug. 5, 2014]. Retrieved from the Internet: <URL: http://www.l-3com.com/about-l-3/company-profile>>.
(Continued)

Primary Examiner — Harunur Rashid
(74) Attorney, Agent, or Firm — Bryan Cave, LLP

(57) ABSTRACT

Systems and methods are disclosed for detecting security threats in a network environment. A canine detection unit may initially inspect items at a screening location. A local workstation is used to further inspect the items that are identified as raising potential security concerns. Requests for assistance are submitted to remote experts for assistance with resolving the potential security concerns. One or more servers receive the requests over a network and retrieve dialing plans associated with the origins of the requests. The one or more servers utilize the dialing plans to route the requests to expert groups assigned to dialing plans. In response to the requests being accepted by remote expert devices in one of the expert groups, the one or more servers establish connections between the local workstations and the remote expert devices that accept the requests.

21 Claims, 15 Drawing Sheets

Related U.S. Application Data which is a continuation-in-part of application No. 14/064,100, filed on Oct. 25, 2013, now abandoned.

(60) Provisional application No. 61/914,777, filed on Dec. 11, 2013.

(58) Field of Classification Search
USPC .......................................................... 726/23
See application file for complete search history.

(56) References Cited

U.S. PATENT DOCUMENTS

| | | | |
|---|---|---|---|
| 6,014,451 A * | 1/2000 | Berry et al. ................ | 382/110 |
| 6,370,222 B1 | 4/2002 | Cornick, Jr. | |
| 6,707,879 B2 | 3/2004 | McClelland et al. | |
| 6,721,391 B2 | 4/2004 | McClelland et al. | |
| 6,829,585 B1 * | 12/2004 | Grewal et al. ............. | 705/7.14 |
| 6,968,034 B2 | 11/2005 | Ellengogen | |
| 7,139,406 B2 | 11/2006 | McClelland et al. | |
| 7,734,066 B2 | 6/2010 | DeLia et al. | |
| 8,031,903 B2 | 10/2011 | Paresi et al. | |
| 8,320,659 B2 | 11/2012 | Song et al. | |
| 8,386,233 B2 | 2/2013 | Khuda | |
| 8,406,385 B2 | 3/2013 | Woodring | |
| 8,931,327 B2 | 1/2015 | Pearce et al. | |
| 2002/0186862 A1 * | 12/2002 | McClelland et al. ....... | 382/100 |
| 2003/0085163 A1 | 5/2003 | Chan et al. | |
| 2005/0008119 A1 | 1/2005 | McClelland et al. | |
| 2005/0031076 A1 | 2/2005 | McClelland et al. | |
| 2006/0047615 A1 * | 3/2006 | Ravin et al. ................. | 706/50 |
| 2006/0115109 A1 | 6/2006 | Whitson et al. | |
| 2006/0274916 A1 * | 12/2006 | Chan et al. ................. | 382/100 |
| 2007/0168467 A1 * | 7/2007 | Hu et al. ..................... | 709/219 |
| 2007/0195994 A1 | 8/2007 | McClelland et al. | |
| 2007/0280502 A1 * | 12/2007 | Paresi et al. ................ | 382/100 |
| 2008/0104174 A1 * | 5/2008 | Deaven et al. ............. | 709/205 |
| 2010/0046704 A1 | 2/2010 | Song et al. | |
| 2013/0034268 A1 | 2/2013 | Perron | |

OTHER PUBLICATIONS

L-3 Communications, Security & Detection Systems [online], [retrieved Aug. 5, 2014]. Retrieved from the Internet: <URL: http://www.sds.l-3com.com>.

TeleSecurity Sciences, Welcome to TeleSecurity Sciences [online], [retrieved Aug. 5, 2014]. Retrieved from the Internet: <URL: http://www.telesecuritysciences.com>.

TeleSecurity Sciences, Background [online], [retrieved Aug. 5, 2014]. Retrieved from the Internet: <URL: http://www.telesecuritysciences.com/background>.

Configuring SmartTech II PC's, Oct. 6, 2009.

MSA Security, Counterterrorism Program Development [online], [retrieved Jan. 20, 2015]. Retrieved from the Internet: <URL: https://web.archive.org/web/20110507141314/http://www.msasecurity.net/security-consulting/counterterrorism-programs/>.

MSA Security, Threat and Risk Assessments (TARA) [online], [retrieved Jan. 20, 2015]. Retrieved from the Internet: <URL: https://web.archive.org/web/20110507152433/http://www.msasecurity.net/security-consulting/threat-and-risk-assessment/>.

MSA Security, Maritime Security Programs [online], [retrieved Jan. 20, 2015]. Retrieved from the Internet: <URL: https://web.archive.org/web/20110507141327/http://www.msasecurity.net/security-consulting/maritime-security-programs/>.

MSA Security, Tactical Security Programs [online], [retrieved Jan. 20, 2015]. Retrieved from the Internet: <URL: https://web.archive.org/web/20110507152429/http://www.msasecurity.net/security-consulting/tactical-security-programs/>.

MSA Security, Emergency Management Planning [online], [retrieved Jan. 20, 2015]. Retrieved from the Internet: <URL: https://web.archive.org/web/20110507152821/http://www.msasecurity.net/security-consulting/emergency-management-planning/>.

MSA Security, Security Program Audits [online], [retrieved Jan. 20, 2015]. Retrieved from the Internet: <URL: https://web.archive.org/web/20110507141215/http://www.msasecurity.net/security-consulting/security-program-audits/>.

MSA Security, Mail Screening Consulting [online], [retrieved Jan. 20, 2015]. Retrieved from the Internet: <URL: https://web.archive.org/web/20110726035336/http://www.msasecurity.net/mail-screening-consulting/>.

MSA Security, Investigations [online], [retrieved Jan. 20, 2015]. Retrieved from the Internet: <URL: https://web.archive.org/web/20110726035856/http://www.msasecurity.net/consulting/investigative-services/>.

MSA Security, Security Technology Center [online], [retrieved Jan. 20, 2015]. Retrieved from the Internet: <URL: https://web.archive.org/web/20110726035535/http://www.msasecurity.net/technology/security-technology-center/>.

MSA Security, Explosive Screening Services [online], [retrieved Jan. 20, 2015]. Retrieved from the Internet: <URL: https://web.archive.org/web/20110728034323/http://www.msasecurity.net/explosive-screening-services/>.

MSA Security, Security Consulting Services [online], [retrieved Jan. 20, 2015]. Retrieved from the Internet: <URL: https://web.archive.org/web/20110728034346/http://www.msasecurity.net/physical-security-consulting-services/>.

MSA Security, Security Training Services [online], [retrieved Jan. 20, 2015]. Retrieved from the Internet: <URL: https://web.archive.org/web/20110708223539/http://www.msasecurity.net/security-training-services/>.

MSA Security, Specialized Protection Programs [online], [retrieved Jan. 20, 2015]. Retrieved from the Internet: <URL: https://web.archive.org/web/20110707110141/http://www.msasecurity.net/specialized-protection-programs/>.

\* cited by examiner

SYSTEMS AND METHODS FOR FACILITATING REMOTE SECURITY THREAT DETECTION

CROSS-REFERENCE TO RELATED APPLICATIONS

The present application claims benefit to and is a continuation-in-part of U.S. patent application Ser. No. 14/567,312 filed on Dec. 11, 2014, which is a continuation-in-part of U.S. patent application Ser. No. 14/064,100 filed on Oct. 25, 2013. U.S. patent application Ser. No. 14/567,312 also claims the benefit of U.S. Provisional Application No. 61/914,777 filed on Dec. 11, 2013. All of these applications are incorporated herein by reference in their entireties.

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE INVENTION

The present principles are directed to systems and methods for detecting security threats, and more particularly, to improving the detection of such threats in a network environment by intelligently routing requests for assistance to remote expert groups in accordance with predefined dialing plans associated with the origin of the requests.

BACKGROUND OF THE INVENTION

The importance of detecting potential security threats has dramatically increased in recent years. Airports, seaports, mailrooms and border checkpoints (e.g., U.S. Customs and Border Protection locations) handle countless packages, shipments and baggage items on a daily basis, some of which may include dangerous articles. Concert venues, sports stadiums and other highly populated locations or high risk environments pose particular concerns given the extensive harm that may be inflicted in the event that a security threat goes undetected. To interject such threats, many locations utilize screening equipment to scan items (e.g., cargo, bags, luggage, mail or shipment containers) for the purpose of detecting explosives, weapons, contraband or other materials that may pose a security risk. The screening equipment (e.g., x-ray machines) is operated by security personnel who may need to be in contact with subject matter experts (e.g., a bomb detection expert) to analyze the items which are being scanned.

In one useful configuration for a threat detection system, individuals who operate and monitor screening devices at the screening locations are placed in communication with experts who are located remotely. Often times, the screening device operators are able to determine whether or not a large majority of items pose a security threat. However, if a screening device operator is unable to determine whether a particular item presents a security threat, the operator may contact the remotely located expert for assistance in evaluating the item. This particular configuration is practical because the number of potential security threats is relatively low in comparison to the total number of items being scanned. Thus, experts need not be located at, dispatched or dedicated to, each and every screening site, giving them the ability to assist multiple sites remotely. Accordingly, a relatively small number of experts can be utilized to assess potential security threats at various screening locations that deploy large numbers of screening devices.

Although the configuration of the threat detection system described above has many advantages, effectively implementing such a system can be difficult for several reasons. The fact that the experts are located remotely from the individuals who are operating the screening devices can create a time delay, with respect to both establishing a connection with the expert and assessing whether a suspicious item poses a security threat. Given the volume of items that need to be evaluated and the safety concerns that are presented by a potential security threat, it is important to minimize the time spent establishing such connections between operators and remote experts, as well as the time required to assess the potential security threat.

In addition, remote experts should be available to answer the requests submitted by the screening operators at all times, regardless of whether the threat detection system is experiencing a high level of traffic. Failure to ensure that all requests are handled appropriately could create dangerous situations (e.g., in the case that a screening operator believes that an item is bomb or a gun) and may cause unnecessary delays for both the screening operators and individuals at the screening locations who are waiting to be inspected.

Ideally, the requests for assistance originating from the screening locations should also be routed to the experts who are best suited to handle the requests. Furthermore, after a remote expert has accepted a request for assistance, the remote expert may not be able to resolve the request and may desire the assistance of a second remote expert. Unfortunately, conventional threat detection systems do not enable a remote expert assigned to a request to communicate with other remote experts in an efficient manner in order to resolve the request. Instead, the local operator at the screening location is typically required to end the help session with the remote expert who has accepted the request and to submit a new request in the hope that he or she is connected with a different remote expert that is able to resolve the request. Thus, a local operator may be required to submit several separate requests before connecting with a remote screener that is able to provide assistance with resolving a request.

Another problem associated with conventional network-based threat detection systems is that these systems require all of the remote experts to be located at a single operations center in order to perform their duties. Requiring the remote experts to be physically present at the operations center can impose serious limitations on the scalability of the system and the ability of the system to service a growing number of customers or screening locations. For example, if all of the remote experts were required to be located at a single operations center, this may reduce the number of qualified remote experts that can be retained to provide assistance (e.g., since the remote experts must be located within traveling distance of the operations center). In addition, this prevents other third-party remote experts (e.g., remote experts who are employed by a customer or at a screening location) to be assimilated into the threat detection system.

Thus, a need exists for providing a threat detection system that is able to efficiently route requests and connect qualified experts with screening operators and customers according to their needs.

SUMMARY OF THE INVENTION

Several embodiments for a threat detection system are disclosed that overcome some or all of the obstacles and problems described above, as well as other obstacles and problems associated with detecting security threats in a network environment. In certain embodiments, a threat detection system includes one or more canine detection teams, one or more screening devices that are utilized by operators at screening locations, and one more remote experts that are configured to provide assistance to the local operators in resolving security threats. To detect security threats, a canine detection team may initially be utilized to inspect a plurality of items (e.g., during a luggage sweep or package truck search). In response to detecting a suspicious item, the item may be subjected to further inspection by a screening device. A local operator utilizing the screening device may communicate with a remotely located expert who can provide assistance with resolving the potential security threat. The remotely located expert can establish a secure and private communication channel with one or more additional experts to jointly resolve the request.

In certain embodiments, the threat detection system has the ability to automatically route requests from screening operators to a hierarchy of different expert groups based on dialing plans that are established for local operators, screening locations and/or customers. Remote experts are assigned to one or more expert groups (e.g., groups allocated to handle particular types of requests or groups allocated to particular screening locations). The dialing plans determine how the requests are routed to the different groups.

A local operator may transmit different types of requests for assistance (e.g., threat assessment requests, diagnostic requests and testing or calibration requests). The dialing plans may indicate a preferred ordering of the remote expert groups for handling each type of request that originates from particular local operators, screening locations or customers. In certain embodiments, a dialing plan defines a hierarchy of expert groups for handling each type of request. The expert group assigned to the first tier of the hierarchy will initially receive requests originating from local operators that are associated with the dialing plan. In the case that the remote experts in the first tier are unable to accept a request, the request will then be forwarded to the group of experts in the second tier. The request may cascade down through a plurality of different tiers as defined by the dialing plan in the event that the expert groups are unavailable to accept the request. A dialing plan can assign a different hierarchy for handling each type of request or can utilize the same hierarchy to handle all requests. The dialing plans help to ensure that all requests are accepted and handled in a timely and efficient manner without requiring the local operators to re-submit a request every time a remote expert or group of remote experts is unavailable.

Once a remote expert from one of the expert groups has accepted a request, a connection is established with the local operator to help resolve the request. The remote expert and local operator can communicate in a variety of different ways (e.g., video conferencing, audio connection, instant messaging or by other means). The remote expert and/or local operator can also submit a request for a second remote expert to join a session to help resolve the request. The dialing plan associated with the local operator, screening location or customer may determine which expert group will receive the request and how the request may be routed among the remote experts in the event that one or more expert groups are unavailable.

The system may be configured to automatically transmit alerts or notifications to administrators (or other individuals) at the operations and/or screening locations in the event that the system determines that one or more expert groups have become unavailable. The alerts and notifications may be utilized by the administrators to designate back-up experts to provide assistance and/or to adjust the dialing plan that is associated with a local operator, screening location or customer.

To accommodate a growing number of customers and/or screening locations, the threat detection system is configured in a manner that does not require remote experts to be physically located at an operations center associated with the threat detection system, thereby eliminating scalability problems and geographic limitations that would have hindered the ability to integrate new and qualified remote experts. Instead, remote experts can perform their jobs remotely from a location that is separate from the operations center and third-party experts (e.g., who are working for the customers or at the screening locations) can be easily assimilated into the system.

One aspect of the invention is to provide a threat detection system that enables local operators to submit requests to one or more remotely located experts for assistance in resolving a potential security threat. The threat detection system may efficiently establish a connection between operators and suitable experts and allows them to communicate and interact in real-time. Another aspect of the invention is to organize remote experts into a plurality of different expert groups for handling specific types of requests and/or handling requests originating from specific screening locations, workstations, screeners and/or customers. Yet, another aspect of the invention is to define dialing plans that indicate how different types of requests will be allocated to the expert groups and how the requests should be handled in the event that an expert group is unavailable. The status of the experts groups may be monitored and alerts or notifications can be provided to appropriate individuals to ensure that back-up experts are available, if necessary. According to embodiments of the present invention, the threat detection system is preferably scalable and can easily integrate new experts and expert groups into the system framework.

Accordingly, several aspects of the invention address the aforementioned needs which include existing problems arising in the realm of computer networked systems, and particularly security threat detection systems, by improving existing routing technology to yield a novel result.

In accordance with certain embodiments of the invention, a system and method are disclose for detecting security threats. The system includes at least one canine detection unit comprising one or more canines and one or more handlers that inspect items at screening locations to detect potential security concerns. The system further includes a plurality of screening devices. The screening devices include imaging systems comprising sensors for inspecting the items at the screening locations. Inputs received through the sensors are transformed into scanning data for display on workstations located at the screening locations. The system further includes a server device that comprises a processor and a non-transitory storage device that stores instructions for establishing connections with one or more remote experts. A first set of selections is received at the server device for creating expert groups such that each of the expert groups defines a set of experts equipped to manage potential security threats. A second set of selections is received at the server for creating dialing plans that are used to route requests received from the workstations at the screening locations to the expert groups. Each dialing plan specifies a sequential ordering of expert groups for handling requests originating from the screening locations. Data is stored on the server device that associates at least one of the dialing plans with at least one of the screening locations. In response to receiving a request submitted by an operator located at one of the screening locations, a dialing plan associated with that screening location is retrieved and an expert group identified in the retrieved dialing plan is selected to receive the request based, at least in part, on the sequential ordering of expert groups specified in the retrieved dialing plan. A connection is established between the operator and an expert in the selected expert group in response to the request being accepted by the expert. The transformed screening data is transmitted to the expert for assistance in resolving the request. An assistance request is received from the expert in the selected expert group for requesting assistance from a second remote expert in resolving the request submitted by the operator. A second connection is established between the expert and a second remote expert in response to the second remote expert accepting the assistance request. The transformed scanning data is transmitted to the second remote expert to permit the second remote expert to provide assistance with resolving the request. The communications between the expert and the second remote expert via the second connection are private and are not visible to the operator on the operator's workstation.

In accordance with certain embodiments of the present invention, a system and method are disclosed for detecting security threats in a network environment. A plurality of screening devices include imaging systems comprising sensors for inspecting items at screening locations. The inputs received through the sensors are transformed into scanning data for display on workstations located at the screening locations. A server device includes a physical memory device and a processor that is configured to execute instructions stored on the memory device. A first set of selections are received for creating expert groups. Each of the expert groups defines a set of experts equipped to manage security threats. A second set of selections are received for creating dialing plans that are used to route requests received from the workstations at the screening locations to the expert groups. Each dialing plan specifies a sequential ordering of expert groups for handling requests originating from the screening locations. Data is stored that associates at least one of the dialing plans with at least one of the screening locations. In response to receiving a request submitted by an operator located at one of the screening locations, a dialing plan associated with that screening location is retrieved. An expert group identified in the retrieved dialing plan is selected to receive the request based, at least in part, on the sequential ordering of expert groups specified in the retrieved dialing plan. A connection is established between the operator and an expert in the selected expert group in response to the request being accepted. Transformed screening data is transmitted to the expert for assistance in resolving the request.

In accordance with certain embodiments of the present invention, a server is disclosed for detecting security threats in a network environment. The server includes a processor and a non-transitory storage device that stores instructions that are executable by the processor. Data is stored that is associated with expert groups and dialing plans, The dialing plans are used to route requests received from workstations at screening locations to the expert groups. Each of the expert groups defines a set of experts equipped to manage security threats and each dialing group specifies a sequential ordering of expert groups for handling requests originating from the screening locations. At least one of the dialing plans is associated with at least one of the screening locations. In response to receiving a request submitted by an operator located at one of the screening locations, a dialing plan associated with that screening location is retrieved. An expert group identified in the retrieved dialing plan is selected to receive the request based, at least in part, on the sequential ordering of expert groups specified in the retrieved dialing plan. A connection is established between the operator and an expert in the selected expert group in response to the request being accepted. Screening data is transmitted to the expert for assistance in resolving the request. The screening data is generated by a screening device that includes an imaging system comprising sensors and inputs received through the sensors are transformed into the scanning data.

These and other features and advantages will become apparent from the following detailed description of illustrative embodiments thereof, which is to be read in connection with the accompanying drawings.

BRIEF DESCRIPTION OF DRAWINGS

The inventive principles are illustrated in the figures of the accompanying drawings which are meant to be exemplary and not limiting, in which like references are intended to refer to like or corresponding parts, and in which.

DETAILED DESCRIPTION OF THE EMBODIMENTS

Figure 1:
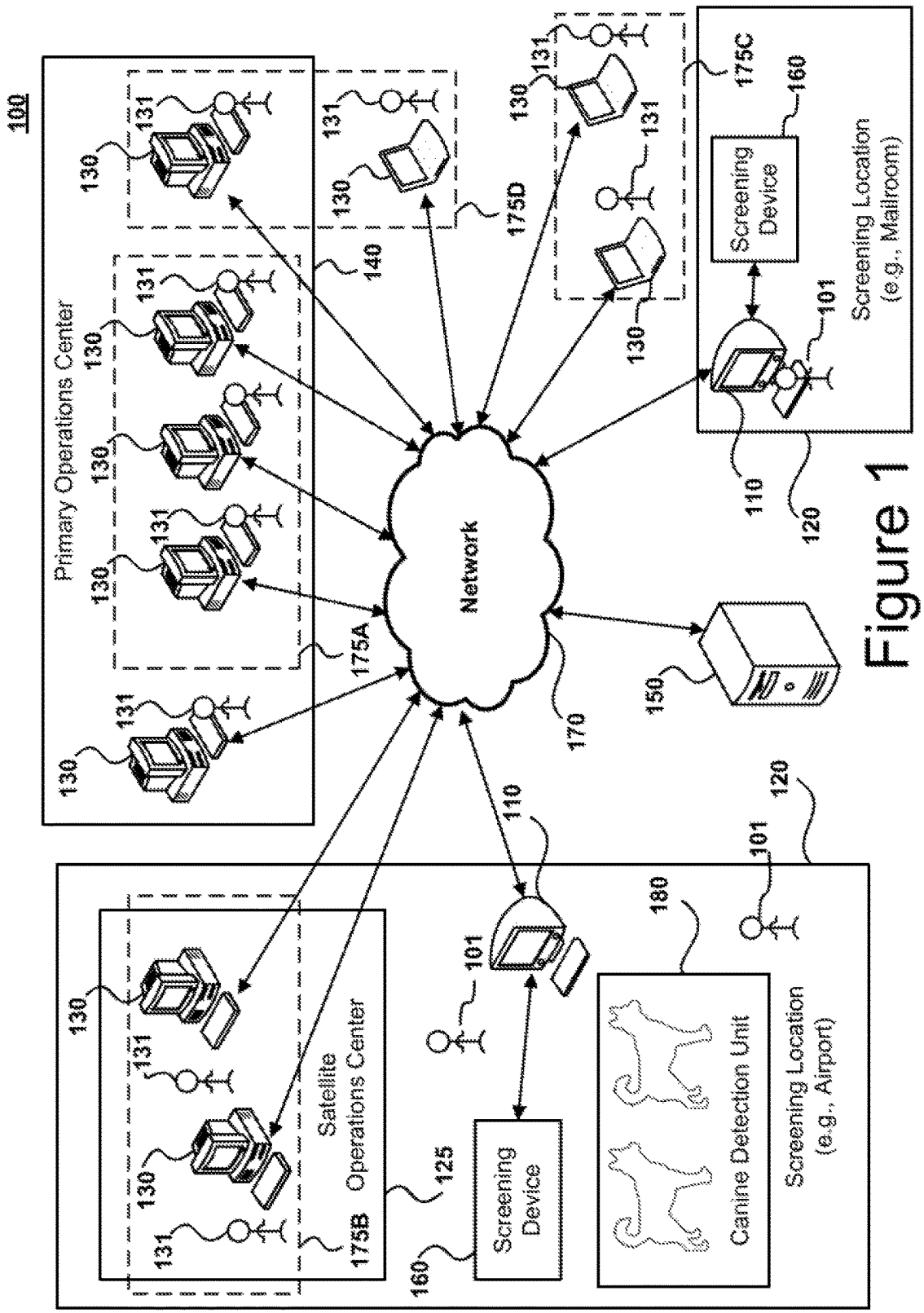
FIG. 1 is a block diagram illustrating a threat detection system in accordance with certain embodiments of the present invention.

In the following description, reference is made to the accompanying drawings that form a part hereof, and in which is shown by way of illustration specific embodiments in which the invention may be practiced. It is to be understood that other embodiments may be utilized and structural changes may be made without departing from the scope of the present invention.

A threat detection system is disclosed for analyzing and detecting security threats at one or more screening locations (e.g., airports, seaports, Customs checkpoints, mailrooms, security checkpoints, stadiums and other venues or high-risk environments). Canine detection units may inspect items or packages at the screening locations. Each canine detection unit may include or more canines that have been trained to detect whether an item (e.g., cargo, bags, packages, luggage, mail, shipment containers or other items) is or contains a security threat. Screening devices at the screening locations may be utilized to further analyze and inspect suspicious items. Similarly, the canine detection units and screening devices may also be utilized to analyze or inspect individuals to determine whether the individuals include items that present a security threat. In certain embodiments, the screening devices may include X-ray scanning equipment, whole body imaging (WBI) equipment, computed tomography (CT) scanning equipment and/or other types of imaging equipment. The screening devices may be utilized to detect security threats including, but not limited to, explosives, weapons, contraband and narcotics.

In certain embodiments, the present invention utilizes a three tier threat detection technique to identify security threats. First, canine units are initially utilized to inspect items. Inspections may be performed systematically or at random, and may be performed at single or plurality of locations in or near a screening location. Second, items that are identified by the canine units as raising a potential security concern are then inspected by one or more screening devices. Third, operators utilizing the screening devices establish connections with remote experts to resolve the potential security threats. The remote experts may optionally establish private and secure communication channels with other remote experts to jointly resolve the potential security threats.

To assist in detecting security threats, the screening devices may analyze items and generate scanning data for display on a local workstation (e.g., desktop computer, laptop computer, tablet, mobile device or other type of computing device) at a screening location. The scanning data displayed on the local workstation may include X-ray images and/or other types of imaging data generated by the screening devices. In some cases, the scanning data may also include a real-time video feed comprising imaging data generated by the screening devices. Local operators at the screening location may inspect the scanning data displayed on the local workstations to determine whether items pose a security threat.

The local workstations situated at the screening location may be in communication with one or more servers over a network (e.g., such as a network that includes the Internet, a local area network, a wide area network, an intranet, a virtual private network or other network). The local operator may submit a request to the server to establish a connection with a remotely located expert. A plurality of different requests may be sent. A first type of request may be a threat assessment request for requesting assistance of a remote expert in determining whether an item poses a security threat. A second type of request may be a diagnostics request for requesting assistance from a remote expert for resolving technical problems. A third type of request may be a testing or calibration request for testing the connectivity of a device being utilized by the local operator and/or for ensuring that screening devices and other equipment are properly calibrated. Other types of requests may also be transmitted.

Requests submitted by the local operator may be transmitted over a network to a server. Upon receiving a request, the server assists with establishing connections between the workstations associated with the local operators and the devices utilized by the remote experts. The connections between the local operators and remote experts permit the local operators to communicate with the remote experts in a variety of different ways (e.g., via voice, video conferencing, text and data communications) in order to resolve the requests.

The server stores pre-defined dialing plans that are utilized to connect local operators with remote experts. Each dialing plan identifies a primary expert group which will initially receive requests originating from the entity assigned to the dialing plan, as well as one or more additional expert groups that are to receive the requests in the event that the experts in the primary expert group are unavailable to accept the request. The dialing plan may establish a hierarchy of remote groups for handling or receiving requests from entities assigned to the dialing plan. For example, requests may initially be routed to the primary expert group at the top of hierarchy and then be routed to expert groups lower in the hierarchy according to a sequential ordering that is specified in the dialing plan.

A dialing plan may be assigned to, or associated with, different types of entities. For example, a dialing plan may be assigned to one or more of a local operator, local workstation, screening location or customer (e.g., a customer that has a plurality of screening locations). Thus, a dialing plan assigned to a local operator identifies which remote expert groups will handle requests originating from the local operator. Similarly, a dialing plan assigned to a screening location or customer identifies the remote expert groups that will receive requests originating from the screening location or customer.

The dialing plans may be configured to route different types of requests to different expert groups. For example, a dialing plan assigned to a screening location may specify that threat assessment requests originating from the location should be routed to a first hierarchy of remote expert groups, while testing and calibration requests should be routed to a second hierarchy of remote expert groups. Each dialing plan can be configured precisely for the entity assigned to the dialing plan to ensure that each type of request is routed to the remote expert groups that are best suited to handle the request and to ensure that all requests are handled in an efficient and expedited manner.

The dialing plans may also be configured to route requests based on the nature of the screening location. For example, expert groups comprised of explosive experts may preferred for some screening locations, while expert groups comprised of chemical experts or firearm experts may be preferred for other screening locations.

The server may include a set of admin controls that permit dialing plans to be defined and assigned to the different entities. For example, administrators associated with an operations center for the threat detection system and/or administrators associated with customers or screening locations may be given access to the admin controls by logging into user accounts stored on the server (e.g., with a username and password). The admin controls may, inter alia, permit the administrators to define expert groups, create dialing plans and associate dialing plans with one or more entities. In creating a dialing plan, the admin controls may permit the administrators to define a unique hierarchy of expert groups for each type of request.

The server may also be configured to submit alerts or notifications to one or more administrators (or other individuals) in certain scenarios. For example, notifications may be transmitted to an administrator in the event that a remote expert or group of remote experts fails to accept one or more requests. Notifications may also be transmitted to notify the administrators that a high volume of requests is being received from one or more screening locations or that highly dangerous items (e.g., bombs) have been detected at one or more of the screening locations. Other types of notifications and alerts may be transmitted.

In certain embodiments, the dialing plans can configured to be dynamically modified based a variety of different conditions or triggering events. For example, in the event that a remote group fails to answer a request or several requests, the dialing plan may automatically be adjusted such that the remote group no longer will receive requests or will receive a smaller number of requests. Likewise, a dialing plan may be dynamically modified in the event that the location of a remote expert (or several remote experts) has changed.

In the event that additional assistance is desired for handling a request, a local operator and/or remote expert may request the assistance of a second remote expert. The dialing plan that was utilized to connect the local operator to the initial remote expert who accepted the request may also specify which remote expert group or groups will receive the request for enlisting the help of the second remote expert. Once again, the request for assistance may cascade through a hierarchy of remote expert groups based on the availability of the experts. After a second remote expert has accepted the request to provide additional assistance, the second remote expert will be given access to any data (e.g., x-rays, images, or communications) that was generated before joining the session, as well as data that was generated after joining the session.

Audit data is stored on the server for each request that is submitted by a local operator. The audit data includes information about the local operator, local workstation, screening device and dialing plan associated with the source of the request, as well as any remote expert and remote expert device that received the request, accepted the request or assisted with handling the request. The audit data may further include scanning data (e.g., images or video) that was generated in analyzing the item that was the subject of a request, as well as any communications (e.g., via voice, text or pictograms) that took place between the local operator and the remote expert associated with the request. The audit data may be utilized to generate reports, circulate alerts, evaluate the performance of individuals (e.g., local operators and remote experts), and for training purposes.

Various aspects of the threat detection system may be in compliance with standards and certifications established by governmental entities, organizations or associations. For example, in certain embodiments, the canine detection units may be certified in accordance with the North American Police Work Dog Association (NAPWDA), the Department of Homeland (DOH) Security SAFETY Act, and/or other standards. Likewise, the system or technology utilized to connect local screening operators with the remote experts may be designated or certified by the DOH Security SAFETY Act. Other aspects of the system may also be certified or in compliance with these or other standards.

Embodiments described herein may be hardware-based, software-based and preferably comprise a mixture of both hardware and software elements. Thus, while the description herein may describe certain embodiments, features or components as being implemented in software or hardware, it should be recognized that any embodiment, feature or component that is described in the figures or description of the present application may be implemented in hardware and/or software. In certain embodiments, particular aspects are implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates or transports the program for use by or in connection with the instruction execution system, apparatus or device. The medium can be magnetic, optical, electronic, electromagnetic, infrared or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

Referring now to the drawings in which like numerals represent the same or similar elements and initially to FIG. 1, a threat detection system 100 is disclosed for detecting security threats. A plurality of screening locations 120 are connected to, and in communication with, a primary operations center 140 and/or a satellite operations center 125 via a network 170. More specifically, local operators 101 situated at the screening locations 120 may utilize local workstations 110 to communicate with one or more remote expert devices 130 to obtain assistance from remote experts 131 in assessing potential security threats at the screening locations 120. In certain embodiments, a server 150 may be utilized to establish a connection between the local workstations 110 and the remote expert devices 130, as well as to perform other types of useful functions related to assessing a security threat. Each screening location 120 may include one or more canine detection units 180 that comprise teams of canines and individuals that are trained to detect security threats.

The network 170 may be any type of network such as one that includes the Internet, a local area network, an intranet, a virtual private network, a wide area network, etc. In certain embodiments, the local workstations 110, remote expert devices 130 and/or the server 150 may be configured to communicate via wired or wireless links, or a combination of the two. In certain embodiments, the local workstations 110, remote expert devices 130 and/or the server 150 may be coupled to the network 170 via a local area network.

The primary operations center 140 may represent a building or headquarters of a business or service that provides assistance with detecting security threats to a plurality of customers (e.g., which may include airports, mailrooms, stadiums or other entities that utilize screening equipment to detect threats). In certain embodiments, the server 150 may be located at and/or integrated with the primary operations center 140. The primary operations center 140 includes remote experts 130 who assist with handling requests submitted by local operators 101 and for providing assistance to remote experts 131 that are located at a plurality of separate satellite operations centers 125.

A satellite operations center 125 may include its own team of remote experts 131 and may also assist with handling requests that are submitted by the local operators 101. In certain embodiments, the satellite operations center 125 may be operated by, or otherwise associated with, personnel or employees of the customers or screening locations 120. The satellite operations center 125 may be located at or near a screening location 120, or may be located external to the screening location 120. As explained in further detail herein, one advantage of the system 100 in FIG. 1 is that it permits the provider of a threat detection service (e.g., which may be based in the primary operations center 140) to easily integrate satellite operations centers 125 and additional remote experts 131 in the system, thus allowing the system 110 to be rapidly scaled and to accommodate growing numbers of customers and/or screening locations 120.

The local workstations 110 and remote expert devices 130 may represent a desktop computer, laptop, cell phone, tablet device, personal digital assistant or other type of computing device including a dedicated processor. The local workstations 110 and remote expert devices 130 may be equipped with one or more storage devices (e.g., RAM, ROM, PROM, SRAM, etc.) and one or more processing devices (e.g., a central processing unit) that are capable of executing computer program instructions. The storage device is preferably a physical, non-transitory medium. The local workstations 110 and remote expert devices 130 may further include a display that is capable of rendering an interface and one or more input devices (e.g., keyboards, microphones, cameras, video cameras, scanners, joysticks, remote control devices, etc.). Local operators 101 and remote experts 131 may manipulate interfaces using the input devices and provide other types of input to communicate with each other.

The server 150 may also include one or more processors and one or more storage devices. The storage device is preferably a physical, non-transitory medium. The server 150 may generally represent any type of computing device that is capable of communicating with the local workstations 110 and remote expert devices 130. In certain embodiments, the server 150 comprises one or more mainframe computing devices. The storage medium on the server can store applications or software code that is configured to provide assistance to local operators 101 and remote experts 131 in performing tasks related to evaluating and resolving security threats. Specifically, the server 150 may be configured to establish connections between the local workstations 110 and remote expert devices 130, and to track data related to requests that have been submitted by local operators 101. The server 150 may store any data that is related to, or associated with, the local workstations 110, remote expert devices 130, local operators 101, remote experts 131, dialing plans and requests that have been submitted by local operators 101.

The screening location 120 may represent any location where items (e.g., luggage, bags, packages or mail) are screened such as an airport, mailroom, court house, stadium, security checkpoint or other location. Each screening location 120 may include one or more canine detection units 180 and one or more screening devices 160 that are configured to analyze, inspect and scan the items. Each canine detection unit 180 may be comprised of one or more canines and one or more handlers (e.g., individuals who are trained to handle or work with the canines in identifying security threats). In certain embodiments, a canine detection unit includes a single handler that is paired with a single canine. The canine detection units 180 may be imprinted, trained and tested to detect one or more families of explosives (e.g., aliphatic, aromatic, nitrate esters, nitramines or acid salts) and/or one or more homemade explosive (HME) threats (e.g., peroxides). Each canine may be trained to utilize its olfactory senses and other senses to detect security threats such as explosives, currency or contraband.

A handler may be trained to recognize when a canine has detected a potential security threat and may be equipped with a mobile device (e.g., a two-way radio, smart phone or other mobile device) that is able to alert law enforcement personnel or individuals associated with the threat detection system 100 when potential security threats have been detected. The mobile device may be configured to communicate over the network 190.

In certain embodiments, the canine detection units 180 may be certified in accordance with the NAPWDA, the DOH Security SAFETY Act, and/or other standards. In addition, each canine team may be subjected to periodic (e.g., bi-annually) training and testing (e.g., in the form of the Department of Justice, National Odor Recognition test). Exemplary breeds of canines that may be utilized in conjunction with the canine detection units 180 may include German Shepherds, Labrador Retrievers, Belgian Sheepdogs, Golden Retrievers, Akitas, Aierdale Terriers and/or other breeds.

A canine and its handler may work as a team to notify individuals associated with the threat detection system when a security threat is present. For example, a canine and its handler may conduct a package search (e.g., when packages are being loaded/unloaded from a truck, boat or plane) by inspecting a shipment of packages. The canine may be trained to notify its handler when it senses a potential security threat. The handler may then utilize a mobile device to notify others of the potential security threat. Appropriate actions that may be undertaken to handle the potential security threat (e.g., such as evacuating an area and/or notifying law enforcement). In certain embodiments, after items are determined to raise a potential security concern, the items are subject to inspection by the screening devices 160 at the screening locations 120.

Generally speaking, the screening devices 160 may represent devices which are capable of detecting security threats or risks including, but not limited to, devices which are capable of detecting explosives, weapons, contraband, narcotics, chemical hazards, or biological hazards. Exemplary screening devices 160 may include X-ray scanning equipment (e.g., the Smith 60-40 DS, Smith 50-30 DS or Morpho XRD 3500), whole body imaging (WBI) equipment (e.g., L-3 ProVision or RapiScan Secure 1000), CT scanning equipment and other types of imaging equipment. In certain embodiments, the screening devices 160 and/or local workstations 110 comprise imaging systems that include a wave generator (e.g., an X-ray generator) that emits electromagnetic waves or radiation and an image detection system that transforms the received electromagnetic waves or radiation into digital or analog images. The image detection system may include sensors (e.g., photo or radiation sensors) for receiving the electromagnetic waves or radiation, and determining the density of items that are being inspected by the screening devices 160. The output from the sensors may then be transformed into the images that are displayed on physical computer monitors of the local workstations 110 and remote expert devices 130.

During or immediately after the screening of an item, a screening device 160 generates scanning data (e.g., which may include one or more images or videos) as a result of the scanning or analysis of an item and provides this information to one or more local workstations 110. The local workstations 110 include software that is able to extract, process, manipulate and render the scanning data on the display of the local workstations 110. For example, the screen devices 160 may generate X-ray images and the software may include a set of image manipulation tools that permit a local operator 101 to rotate the images, zoom in/out on portions of the images, render the images in black and white, render the images in color or provide other types of image manipulation functions.

In certain embodiments, the screening devices 160 generate images of the items being scanned and the colors are assigned to portions of the images based on the density of the items in the image. The software on the local workstations 110 may display a warning or set off an alarm in response to detecting an item having a particular density. For example, if an item being scanned has the same or similar density as a C4 explosive, or other item that poses a security threat, the software may alert the local operator 101.

The local operator 101 may analyze the scanning data, possibly with the assistance of the manipulation tools, to determine whether an item being scanned is a security threat. If a local operator 101 is unable to determine whether an item is a security threat (or otherwise desires the assistance of a remote expert 131 for other reasons), the local operator 101 may transmit a request for assistance to a remote expert 131. In certain embodiments, the local operator 101 may request the assistance of a remote expert 101 by selecting a connection button on an interface that is displayed on the local workstation 110 (e.g., by clicking on the button with a mouse or selecting the button with a gesture on a touch screen interface). As explained herein, predefined dialing plans may be used to connect the local operator 101 with a remote expert 131.

In certain embodiments, the local operator 101 may be able to submit three different types of requests to a remote expert 131. The first type of request is a threat assessment request which requests the assistance of a remote expert 131 in evaluating a potential security threat. The second type of request is a test and calibration request which can be utilized to confirm that a connection between a local workstation 110 and screening device 160 is able to be established. The third type of request is a diagnostics request which requests the assistance of a remote expert 131 (or technical expert) for troubleshooting or resolving technical difficulties associated with the local workstation 110 and/or screening device 160. The request may be encrypted, along with any other communications that take place among the remote expert 131, local workstation 110 and/or server 150.

In certain embodiments, each type of request may be assigned a priority indicator that identifies the importance of the request and that may be used to determine an order in which requests are routed to remote experts 131. In certain embodiments, threat assessment requests may be assigned the highest priority, diagnostics requests may be assigned the second highest priority, and test and calibration requests may be assigned the lowest priority. Thus, if a threat assessment request, diagnostics request and test and calibration request are submitted simultaneously by different local operators 101, the threat assessment request will be handled before the other requests since the threat assessment request is given the highest priority.

In certain embodiments, different types of threat assessment requests may be submitted and each may be assigned its own priority. For example, threat assessment requests may be assigned a priority ranking based on the location where the request originated or if a local operator 101 indicates that the request is a high priority.

In certain embodiments, the request submitted by the local workstation 110 is transmitted to the server 150. The server 150 maintains a list of all local workstations 110 and remote expert devices 130 that are connected to and registered with the system, as well as dialing plans associated with each of the customers or screening locations 120 (and/or dialing plans associated with the local operators 101 or local workstations 110). In response to receiving the request 150, the server 150 attempts to establish a connection with a remote expert device 130 that has registered with the server 150. In certain embodiments, this may include determining the status of the remote expert devices 130 that have registered with the server 150 and selecting a remote expert device 130 to handle the request. In certain embodiments, this may further include transmitting the request to remote expert devices 130 in one or more expert groups 175 in accordance with a dialing plan that is associated with the origin of the request (i.e., associated with the local operator 101, local workstation 110, screening location 120 and/or customer that submitted the request). Additional details regarding the manner in which connections can be established between local workstations 110 and remote expert devices 130 is discussed in further detail below with reference to FIGS. 4-5.

In certain embodiments, the remote experts 131 are organized into a plurality of different expert groups 175. The boxes having broken lines in FIG. 1 demonstrate exemplary groupings of remote experts 131. The exemplary system 110 shown includes a first expert group 175A that is comprised of remote experts 131 located at the primary operations center 140 and a second expert group 175B that is comprised of remote experts 131 located at a satellite operations center 125. A third expert group 175C is comprised of remote experts 131 who are not located at any operations center. These may represent remote experts 131 who are independent contractors that are hired by the threat detection service provider. A fourth expert group 175D comprises both remote experts 131 located at the primary operations center 140 and remote experts 131 who do not operate within an operations center. The remote experts 131 can be organized in other ways as well. For example, in certain embodiments, an expert group 175 may comprise remote experts 131 from both a primary operations center 150 and a satellite operations center 175, as well as remote experts 131 that do not operate within any operations center. Additionally, it should be noted that a remote expert 131 may be included in or associated with more than one expert group 175.

The server 150 stores data specifying and associating a dialing plan with each customer and/or screening location 120. In certain embodiments, the server 150 may also store data specifying and associating a dialing plan with each local operator 101 and/or local workstation 110. Each dialing plan identifies a plurality of expert groups 175 and specifies a hierarchy or sequential ordering of the identified expert groups for handling the requests. A dialing plan may specify a different hierarchy or different sequential ordering of the expert groups 175 for each type of request (e.g., threat assessment request, diagnostic request or testing and calibration request) or may utilize the same hierarchy or sequential ordering of the expert groups for all requests. Organizing sets of remote experts 131 into logical groupings and establishing dialing plans based on those groupings permits the system to customize the handling of requests in a manner that is optimal for each individual screening location and/or customer.

To illustrate how a dialing plan is utilized, consider an exemplary scenario in which a threat detection service provider (e.g., associated with the primary operations center 140) provides assistance to a customer that represents an airport. The airport may include a plurality of terminals, each of which utilizes dozens or hundreds of screening devices 160 to inspect items or persons. A local operator 101 may submit a request for assistance. The request includes data that identifies the type of request and the origin of the request (e.g., that identifies the customer, screening location, local operator and local workstation). In response to receiving the request, the server 150 may utilize the origin data included in the request to retrieve a dialing plan that has been created for the customer. The server 150 may then analyze the request to determine the type of request that was submitted. For example, the request data may indicate that the local operator 101 submitted a threat assessment request. The server 150 then utilizes the dialing plan to determine the appropriate manner of handling a threat assessment request for this particular customer.

In this example, the dialing plan may specify that the received request should initially be forwarded to an expert group 175B that is located at a satellite operations center 125. The satellite operations center 125 may be operated by, and associated with, the customer and may include remote experts 131 that are employed by the customer. The server 150 may select one of the remote experts in the expert group 175B to receive the request in the manner similar to that described below with reference to FIG. 4. For example, the server 150 may select one of the experts in the expert group 175B by identifying the experts in the group that are available to handle the request (e.g., not idle, timed-out or currently servicing a different request) and selecting the expert that has not serviced a request in the longest period of time. In the event that the selected remote expert in the expert group 175B does not accept the request, the remote expert 131 may be designated as idle and the server 150 may select another expert in the group 175B in the same manner. If none of the experts in the expert group 175B identified by the dialing plan accept the request, the server 150 may utilize the dialing plan to select a different expert group 175 for handling the request.

Staying with this example, in response to determining that the remote experts 131 in the expert group 175B associated with the satellite operations center 125 have not accepted the request from the local operator 101, the server 150 may utilize the dialing plan to select a different expert group 175. For example, the dialing plan may specify that an expert group 175A located at the primary operations center 140 is next to receive the request. A remote expert 131 may be selected from this second-tier expert group 175A in a similar manner (e.g., by identifying the experts in the group that are available and selecting the expert that has not serviced a request in the longest period of time). Likewise, if none of the experts in the second-tier expert group 175A accept the request, the dialing plan may be utilized to select a third-tier expert group (e.g., 175C or 175D) to handle the request, and so on. In this manner, a request from a local operator 101 may cascade down through a hierarchy of expert groups 175 that is defined by the dialing plan until the request is ultimately accepted. Any number of experts groups 175 may be incorporated into a dialing plan.

To help monitor and optimize the routing of requests, the server 150 may be configured to transmit notifications or alerts to administrators or other individuals associated with primary operations center 140 and/or satellite operations center 125. For example, the notifications may be transmitted to an administrator at the primary operations center 140 in the event that an expert group 175 fails to accept one or more requests or in the event that a high volume of requests is being received from particular screening locations 120 and/or customers. This may allow the administrator to quickly allocate back-up experts to provide additional assistance (e.g., by adjusting the applicable dialing plan or by allocating additional experts to the expert group 175). Other types of notifications and alerts may also be transmitted.

After a request is accepted by a remote expert 131, the server 150 establishes a connection between the local workstation 110 associated with the operator 101 who submitted the request and the remote expert device 130 associated with the remote expert 131 that accepted the request. In certain embodiments, the connection between the local workstation 110 and the remote expert device 130 provides multiple communication channels. For example, the connection may establish separate communication channels for communicating voice, text (e.g., text provided by an instant messaging feature) and data between the local workstation 110 and the remote expert device 130. In certain embodiments, a live audio/video feed may also be utilized. The connection may be utilized to transmit X-ray images (and other scanning data) of items that pose a potential security threat to the remote expert device 130 in order to permit the remote operator 131 to review and evaluate the item. The connection may also provide information to the remote expert 131 that is associated with assessments or inspections made by canine detection units 180. For example, information may be displayed to the remote expert 131 that indicates the type of security threat (e.g., explosives or narcotics) that was sensed by a canine and the particular canine detection unit 180 that identified a potential security threat. Any or all of the communication channels may be encrypted for security purposes.

The software on the remote expert devices 130 may permit a remote expert 131 to view the images or other scanning data that is displayed on the screen of the local expert devices 110. As a local operator 101 analyzes and manipulates the scanning data on a local workstation 110, this can be viewed in real-time by the remote expert 131 on the display of the remote expert device 130. The software on the remote expert devices 130 also provides the remote experts 131 with the manipulation tools for analyzing the scanning data.

In certain embodiments, the remote experts 131 can also be provided with remote access to the local workstations 110 to enable the remote experts 131 to remotely control the local workstations 110. The remote experts 131 may utilize the remote access connection in order to assess the item being scanned, to monitor the performance of a local operator 101, to assist with troubleshooting and technical issues, or to perform diagnostic functions associated with the local workstations 110 and/or screening devices 160.

In certain embodiments, a remote expert 131 may request the assistance of a second remote expert 131 while servicing a request. This may be performed by selecting a button or element on an interface that is displayed on the remote expert device 130 being operated by the remote expert 131. After a second remote expert has accepted the request and joined the session, the second remote expert will be given access to any data (e.g., x-rays, images, or communications) that was generated before joining the session, as well as any data that was generated after joining the session. The second remote expert may also be permitted to communicate with the initial remote expert that accepted the request 131 and the local operator 101 in a variety of different ways (e.g., via instant messaging, pictograms, video conference or other known means). In certain embodiments, the two remote experts may collaborate and communicate over a private communication channel that is invisible to the local operator 101. Thus, the local operator 101 may be unaware that the expert 131 who accepted the request is communicating with a second expert 131 to assist with resolving the request.

The dialing plan that was utilized to connect the local operator to the initial remote expert may also be utilized to select the second remote expert. For example, the dialing plan may identify a remote expert group or hierarchy groups that will receive the request for enlisting the help of the second remote expert. Once again, the request for assistance may cascade through a hierarchy of remote expert groups based on the availability of the experts in those groups. It should be recognized that the remote expert 131 may request the assistance of more than one remote expert 131 to handle a single request. For example, several remote experts 131 may join a session to assist with handling a request.

After a remote expert 131 (or team of remote experts 131) has finished evaluating an item, the remote expert 131 can communicate the results of the evaluation to the local workstation 110. The communication tools (e.g., voice, text and ability to view images as they are scanned) provided by the system enable the remote expert to interact in real-time with the local operator 101. For example, the remote expert 131 may indicate the conclusion reached by the remote expert 131 regarding whether or not an item is a true security threat or may indicate that it is unclear whether an item is a true security threat. The remote expert 131 may further instruct the local operator 101 to manipulate the item (e.g., to rotate or flip the item and re-scan the item). The remote expert 131 may also provide instructions to the local operator 101 for handling a potential or actual security threat. For example, the instructions may indicate that the screening location 120 should be evacuated, the item should not be touched or moved, the person who possessed the item should be questioned or that the item does not pose a security threat.

The manner in which the remote expert 131 communicates with the local operator 101 may vary. The connection established between the local operator 101 and the remote expert 131 may provide voice communications, thus permitting the parties to speak to one another. The local operator 101 and remote expert 131 may also utilize an instant messaging application or other messaging feature to communicate. As explained in further detail below, the local operator 101 and remote expert 131 may also utilize pictograms to unambiguously convey messages to one another. The pictograms may represent an image or overlay element that includes icons, images, text and/or other multimedia data for conveying a particular message (e.g., messages indicating that a local operator should rotate or flip an item being inspected by a screening device, a problem exists with an audio or video connection, or an item poses a security threat). Rather than creating a custom message each time a particular situation arises (e.g., each time the remote expert 131 determines that an item is not a security threat), a pictogram may be selected for communicating the message.

It should be noted that the system in FIG. 1 is merely meant to demonstrate an embodiment of an operating environment that can be utilized in conjunction with the invention taught herein, and should not be construed as limiting in any manner whatsoever. The particular configuration in FIG. 1 can be altered in numerous ways without departing from the principles herein. For example, it should be noted that the functionality of the server 150 in FIG. 1 may represent a plurality of servers 150. In addition, any number of screening locations 120, local workstations 110, remote expert devices 130, primary operations centers 140 and satellite operations centers 125 may be utilized with the system 100 and the system may be configured in a variety of different ways (e.g., in a distributed computing environment, cloud-based environment, client-server environment, etc.). Similarly, any number of experts groups 175 may be established and additional expert groups 175 may be incorporated into the system.

Furthermore, it should be recognized that the functionality provided by the server 150 may be performed locally by the workstations 110, remote expert devices 130, or a combination of the two. Thus, any processes or procedures performed by the server 150 can alternatively be implemented by the workstations 110 and/or remote expert devices 130, and vice versa.

In addition, while the disclosure herein refers to a threat detection system 100 which scans items to detect potential security threats, it should be understood that the term "items" is also meant to encompass individuals. Thus, any disclosure herein which relates to scanning items should also be understood to encompass the scanning of individuals (e.g., using WBI equipment). Furthermore, while the disclosure herein describes experts 131 as being "remote" or "remotely located," it should be understood that this does not necessarily require the experts 131 to be in a location which is physically separate from the screening location 120, but is merely meant to imply that the experts 131 are not located in the immediate vicinity of the screening device 160 or local operator 101. For example, in certain embodiments, the remote experts 131 and satellite operations center 125 may be located in a security room at a screening location 120.

Figure 2:
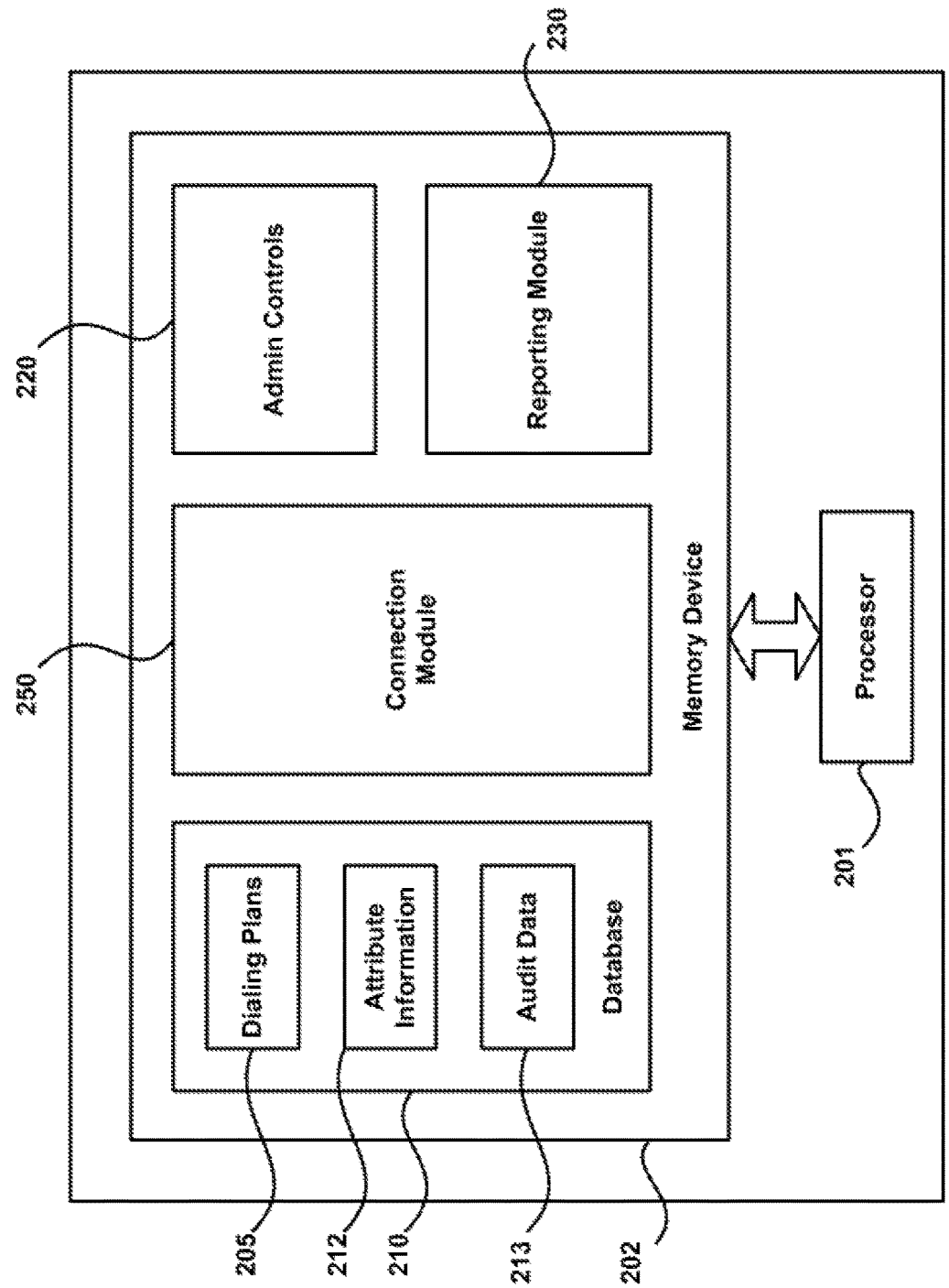
FIG. 2 is a block diagram illustrating a detailed view of a threat detection server in accordance with certain embodiments of the present invention.

Moving on to FIG. 2, a detailed view of the server 150 is disclosed in accordance with certain embodiments of the present invention. As shown therein, the server 150 includes a plurality of software components (e.g., connection module 250, admin controls 220, etc.) stored on a memory device 202 (e.g., RAM, ROM, PROM, SRAM, etc.). The memory device 202 is in communication with one or more processors 201 that may be configured to execute the instructions associated with software components.

It should be noted that although the components on the memory 202 device may be described throughout this disclosure as software modules, such is not necessary. Any of the components may be implemented as software, hardware or a combination of the two. Furthermore, while the components may be illustrated as separate and distinct components, it should be recognized the components can be combined in a variety of different ways (e.g., all of the components may be executed as a part of a single program or as separately executing processes or threads) and that the functions performed by these components may overlap in some instances. In order to demonstrate the functionality performed by these components, reference will be made to FIGS. 3A-3J, which disclose exemplary interfaces that may be displayed on the local workstations 110 and remote expert devices 130, as well as FIGS. 4-5, which demonstrate exemplary methods that may be implemented by the server components, possibly in conjunction with other components of the system 100.

As explained above, there are many obstacles to providing an effective threat detection system in which experts are situated remotely from a screening device or screening location. First, the system should be able to minimize downtime as well as the delay associated with establishing a connection and evaluating a security threat. Second, the system should be able to allow local operators and remote experts to communicate and interact in real-time. Third, the system should be able to uniquely route the requests in a manner that is optimal for the customer or location from which the request originated. Fourth, the system should be scalable such that additional screening locations 120, customers and remote experts 131 can be easily integrated into the system. Fifth, the remote experts 131 who accept the requests should be able to quickly request the assistance of other remote experts to help resolve the requests. The connection module 250 and other components on the server 150 assist with overcoming these and other difficulties.

Several features may be incorporated into the connection module 250 in order to address the efficient routing of requests and establishment of connections in a way that minimizes waiting and downtime. Initially, each of the local workstations 110 and remote expert devices 130 may register with the server 150 so that the server 150 can determine the devices which are connected to the system 100. For example, each device may register with the server 150 by submitting login credentials (e.g., username and password) or establishing a connection with the server 150.

Figure 3A:
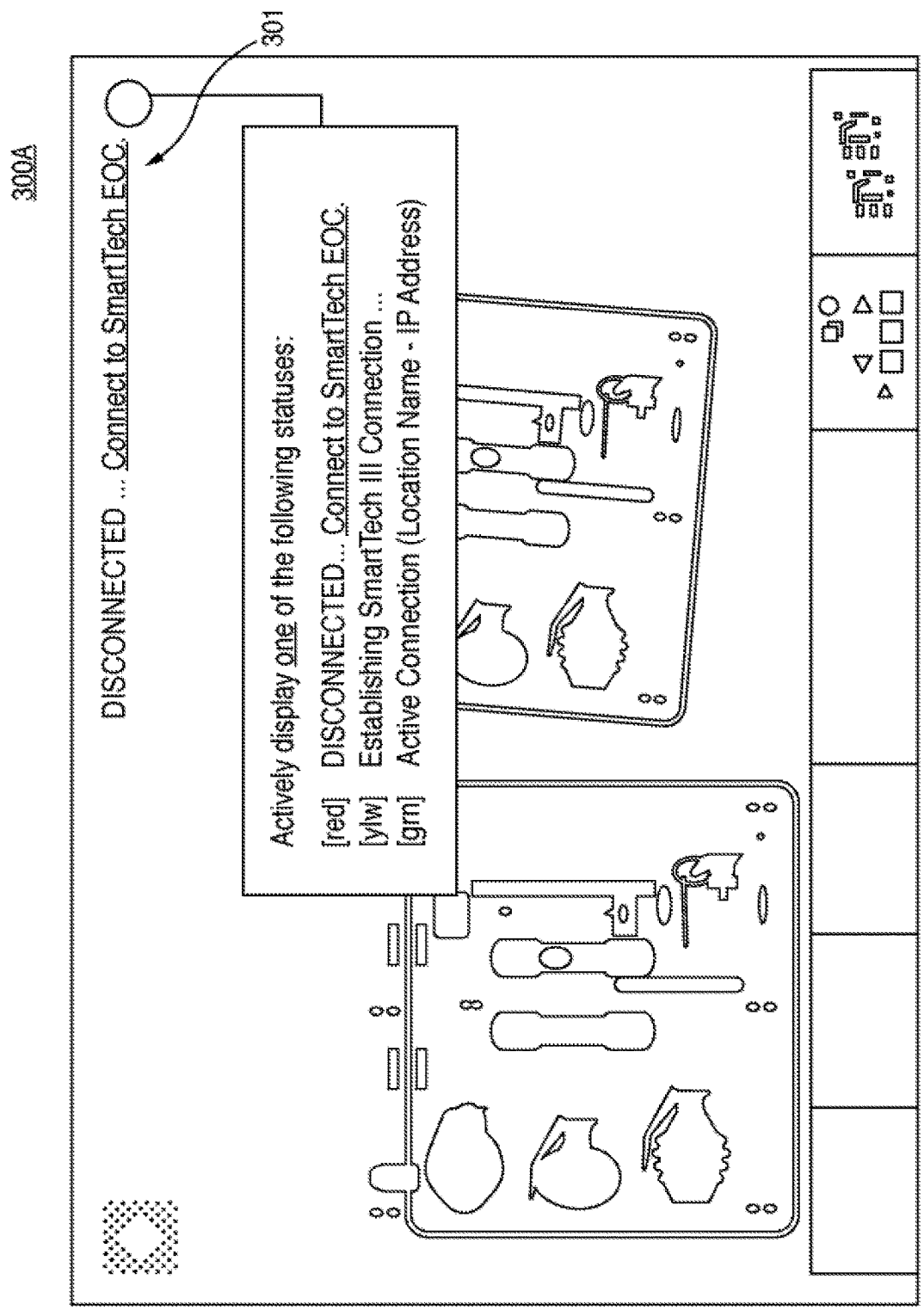
FIG. 3A illustrates an exemplary startup interface that may be displayed on a local workstation in accordance with certain embodiments of the present invention.

FIG. 3A illustrates an exemplary interface 300A that may be displayed on a local workstation 110 as a local operator 101 registers with the server 150. An indicator is displayed in the upper right portion of the interface which specifies the status of the connection between the local workstation 110 and the server 150. For example, the indicator may specify that the local workstation 110 is disconnected from the server 150, establishing a connection with the server 150 or connected to the server 150. If the local workstation 110 is not connected to the server 150, then a local operator 101 may select a connection option 301 (e.g., link, button or other interface element) to connect to the server 150. A similar interface may be displayed on a remote expert device 130 for registering with the server 150. After a local workstation 110 or remote expert device 130 registers with the server 150, the server 150 can determine that the device is connected to the system and can account for any attributes associated with the local workstation 110 or remote expert device 130, as well as the attributes associated with the local operator 101 and remote expert 131 who are operating the devices. The server 150 is also able to determine the dialing plan that is assigned to the local workstation 110.

Figure 3B:
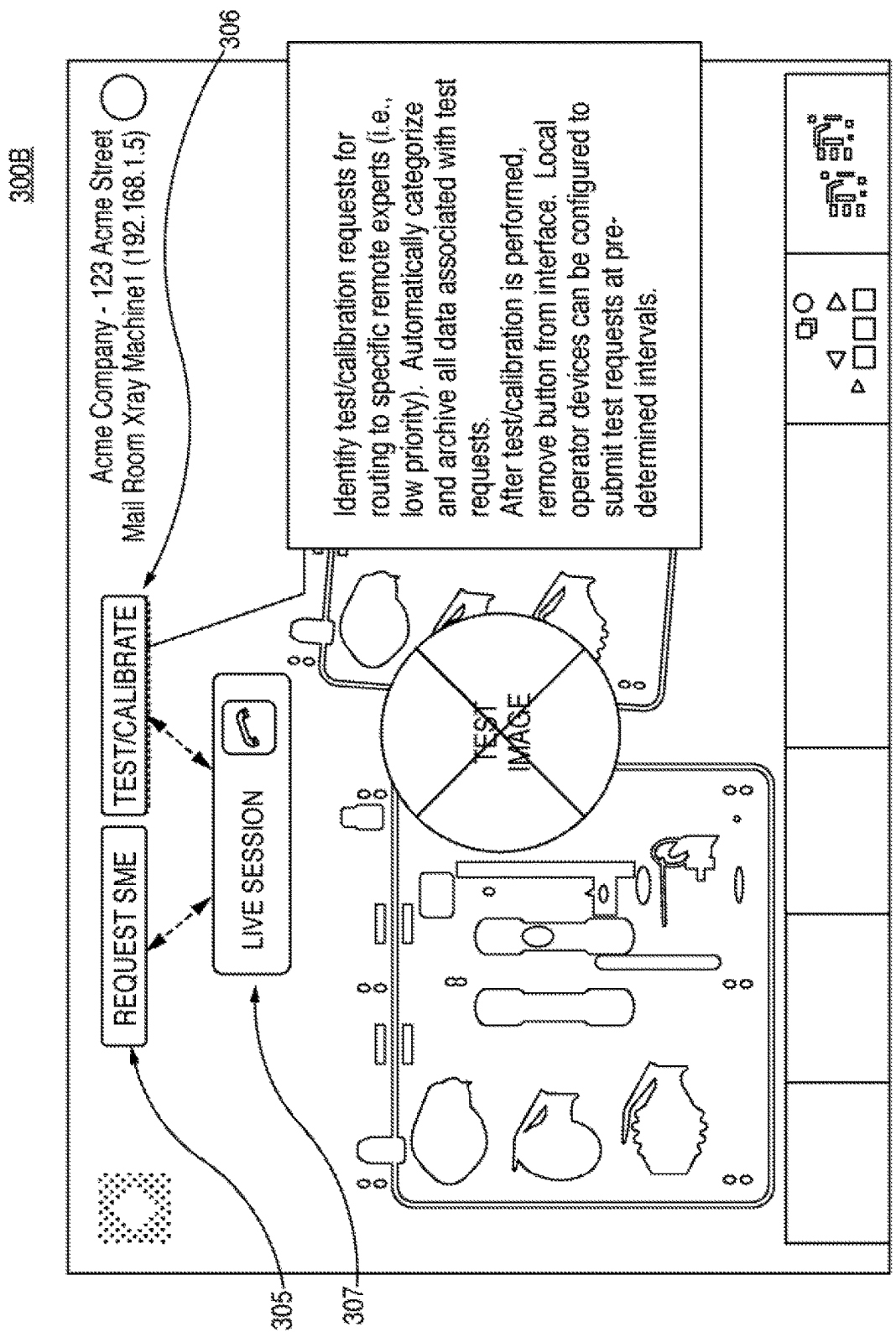
FIG. 3B illustrates an exemplary interface that may be displayed on a local workstation for submitting requests for assistance to a remote expert in accordance with certain embodiments of the present invention.

After the local workstation 110 has established a connection with server 150, a display may be presented to the local operator 101 which permits the local operator 101 to request assistance from a remote expert 131. For example, FIG. 3B illustrates an exemplary interface 300B which includes a threat assessment request option 305 and a testing and calibration request option 306. The local operator 101 may select the threat assessment request option 305 in order to request assistance from a remote expert 131 with respect to determining whether an item being inspected is a security threat. The local operator 101 may also select a testing and calibration request option 306 in order to ensure that a connection has been established with the server 150 and that the screening device 160 connected to the local workstation 110 is properly calibrated. In certain embodiments, a third diagnostics option may also be displayed on the interface for requesting diagnostic or troubleshooting assistance for either the local workstation 110 or the screening device 160. As mentioned above, the server 150 may give threat assessments a higher priority when it comes to routing the request to a remote expert 131. Also, the dialing plan that is used to route requests from the local workstation 110 may designate different hierarchies of remote expert groups 175 for handling each type of request. When a remote expert 131 accepts a request and establishes a session with the local operator 101, a live session indicator 307 may appear on the display.

In response to submitting a request, the connection module 250 may retrieve a dialing plan 205 associated with the customer or screening location 120 from a database 210. The dialing plan 205 may then be utilized by the connection module 250 to select an expert group 175 for receiving the request. The connection module 250 analyzes the request to identify the type of request that has been submitted and utilizes the retrieved dialing plan 175 to select an expert group 175 or hierarchy of expert groups 175 for receiving the request. The connection module 250 may select a remote device 130 included in the selected expert group 175 in a variety of different ways.

In certain embodiments, the connection module 250 utilizes, inter alia, status information to select a remote expert device 130 in the selected expert group 175 to receive the request. Each remote expert device 130 may be assigned a status identifier that can be utilized by the server 150 to determine whether or not the remote expert device 130 has the ability to answer a request for assistance or is likely to answer a request for assistance. For example, in certain embodiments, each of the remote expert devices 130 may be assigned one of three statuses:

(1) Idle: This status indicates that a remote expert device 130 is not likely to answer a request for assistance due to inactivity. A remote expert 131 may explicitly indicate that the device is idle (e.g., by selecting a button presented on the interface which is displayed on the remote expert device 130). The server 150 may also designate a remote expert device 130 as idle if the remote expert device 130 does not respond to a request for assistance from a local operator 101. A remote expert device 130 which is designated as idle may become active when a remote expert 131 explicitly indicates that the device should be designated as active.

(2) Busy: This status indicates that a remote expert device 130 is currently assisting a local operator 101 with a request. Each time a connection is established between a local workstation 110 and a remote expert device 130, the server 150 may be notified that the remote expert device 130 should be designated as busy. After the request is handled, the server 150 may be notified that the remote expert device 130 is no longer busy and the server 150 may designate the remote expert device 130 as active.

(3) Active: This status indicates that a remote expert device 130 is available to assist a local operator 101 with a request.

Similar status information may be maintained for each expert group 175. For example, an expert group 175 may be designated as active if there is at least one remote expert 131 assigned to the group that is available to accept a request, and may be designated idle if no one in the group accepts a request that has been forwarded to the expert group 175. In the event that an expert group 175 has been designated as idle, requests will not be sent to the expert group 175. Instead, the requests will be forwarded to the next expert group 175 in the hierarchy as defined by the dialing plan. An expert group that is designated as idle may become active when a remote expert 131 in the group explicitly indicates that he or she is available to assist with handling requests. An expert group 175 may also be designated as busy if all of the registered remote experts 131 in the group are currently assisting local operators 101 with requests.

Because the connection module 250 maintains a listing of all registered devices and expert groups 175, along with statuses of the registered remote expert devices 130 and expert groups 175, the connection module 250 is able to intelligently select a remote expert device 130 that has a high probability of responding to requests from local operators 101. In certain embodiments, the dialing plan 205 is used to identify and select an active expert group 175. For each remote expert device 130 in the selected expert group 175 that is designated as active, the connection module 250 determines when the last request was transmitted to, accepted, or concluded by the remote expert device 130. The connection module 250 may then select the remote expert device 130 for which the longest period of time has elapsed since the device received a request, accepted a request or concluded a request. The server 150 may then forward the request to the selected remote expert device 130.

If the remote expert 131 associated with the selected expert device 130 accepts the request, a connection is established between the local workstation 110 that sent the request and the selected remote expert device 130. However, if the remote expert 131 associated with the selected remote expert device 130 does not respond to the request, the connection module 250 may designate the remote expert device 130 as being idle. The connection module 250 will then repeat the above-described process to select another remote expert device 130 in the selected expert group 175, thus resulting in the selection of the next registered remote expert device 130 in the expert group 175 that is designated as active and that has not received, accepted or concluded a request in the longest period of time. The dialing plan will be used to select another expert group 175 to receive the request if none of the remote experts 131 in the selected expert group 175 accept the request. Configuring the server 150 to establish connections in this manner permits the server 150 to intelligently identify remote expert devices 130 and expert groups 175 that have a high probably of accepting requests for assistance, thus reducing downtime and waiting time when establishing a connection.

As explained above, the connection module 250 may utilize the dialing plan associated with the origin of the request to select other expert groups 175 to handle the request in the event that no one in the selected expert group 175 accepts the request. In the event that a request is not accepted by any of the remote experts 131 in a selected expert group 175, the connection module 250 may designate the expert group 175 as idle. Future requests will not be forwarded to an expert group 175 that is designated as idle. In addition, alerts or notifications may be sent to administrators or other individuals associated with the primary operations center 140 and/or satellite operations center 125 when an expert group 175 is designated as idle.

Attribute information 212 stored in a database 210 on the server 150 may be utilized by the connection module 250 to efficiently route a request and reduce the time delay associated with assessing a potential security threat. More specifically, the server 150 may store attribute information 212 that indicates traits, characteristics, and other information about the local operators 101, local workstations 110, remote experts 131, remote expert devices 130, expert groups 175 and/or the screening devices 160. For example, attribute information 212 may be stored for each local operator 101 and each remote expert 131 which indicates the individual's name, level of experience and the language or languages which are spoken by the individual (or which are preferred by the individual). Attribute information 212 may also be stored for each local workstation 110 which indicates the location of the device (e.g., which identifies the screening location 120 and geographic location where the device is located), the version of the software installed on the device and the type of screening device 160 (e.g., manufacturer and model) that is being utilized by the local operator 101 or which is in communication with the local workstation 110. Attribute information 212 may also be stored for each remote expert device 130 that indicates the version of software installed on the devices, the location of the devices (e.g., whether the devices are located at the operations center 140 or other location). Attribute information 212 may further be stored for each expert group 175 that identifies the remote experts 131 included in the group and that identifies the status of the expert group (e.g., active, busy or idle). The attribute information 212 may also reflect characteristics of the canine detection units 180 utilized at a particular screening location 120, including information that identifies the type of security threats that the canine detection units 190 have been trained to detect. Other types of attribute information 212 may also be stored in the database 210 located on the server 150.

In addition to, or aside from, the status information discussed above, the connection module 250 may utilize the attribute information 212 to select the most appropriate remote expert device(s) 130 to which a request for assistance is routed. Specifically, the connection module 150 may analyze the attribute information 212 to determine the languages spoken by the local operator 101 and the remote expert 131, and to ensure that the local operator 101 and a selected remote expert 131 are able to speak the same language. For example, as part of the process of selecting a remote expert 131, the connection module 150 may only connect a local operator 101 with a remote expert 131 that speaks the same language or may give a higher priority to remote experts 131 that speak the same language as a local operator 101. As another example, the connection module 150 may only connect a local workstation 110 with a remote expert device 130 that is running the same version of software as the local workstation. As an even further example, the connection module 150 may only connect a local operator 101 with a remote expert 131 that is located within a particular distance of the local operator 101, or located within the same country or region as the local operator 101. In certain embodiments, the connection module 150 may select or give a higher priority to remote experts 131 that that have expertise in resolving security threats that are detectable by canine detection units 180 located at the screening location where the request originated. The manner in which the connection module 150 may utilize the attribute information in establishing the connection may vary.

The language preferences included in the attribute information 212 may also be utilized to facilitate communications between a local operator 101 and remote expert 131 in the situation where a local operator 101 and remote expert 131 do not speak the same language. As mentioned above, the remote expert 131 and local operator 101 may utilize pictograms to communicate with each other. In the case that an operator 101 or expert 131 selects a pictogram to be transmitted to the other party, the server 150 may select the content of the pictogram to ensure that the message associated with the pictogram will be conveyed to the intended recipient of the pictogram in a language which is understood by the recipient.

More specifically, a set of pictograms may be provided to both local operators 101 and remote experts 131. As mentioned above, each pictogram may include text, icons, images and/or other multimedia data for conveying a particular message. Exemplary pictograms may convey messages relating for evaluating potential security threats, testing, troubleshooting and diagnostic issues. For example, a remote expert 131 may transmit a pictogram to a local operator 101 that indicates whether or not an item is a security threat. In order to assist the remote expert 101 with analyzing an item, the remote expert 131 may also transmit pictograms that instruct the local operator 101 to rescan an item utilizing a screening device 160 or to rotate or flip an item that is being inspected. Similarly, other types of pictograms provided for testing, troubleshooting or diagnostic issues may convey messages indicating whether a local workstation 110 is properly connected to the system, whether a screening device is properly calibrated, or whether a particular communication feature (e.g., a voice, text or data connection) is functioning properly. Additional pictograms may also be provided for conveying other messages.

Each pictogram may be associated with content for each of a plurality of languages (e.g., English, Spanish, French, Arabic, etc.). In the case that the local operator 101 and remote expert 131 do not speak the same language, one of the parties may select a pictogram to transmit to the other party. Thereafter, the connection module 250 may receive the request to transmit the pictogram. The connection module 250 may then identify a language preference for the intended recipient of the pictogram and select content for the pictogram based on the language preference, thus ensuring that the message associated with the pictogram will be conveyed in a language which is understood by the recipient.

Figure 3C:
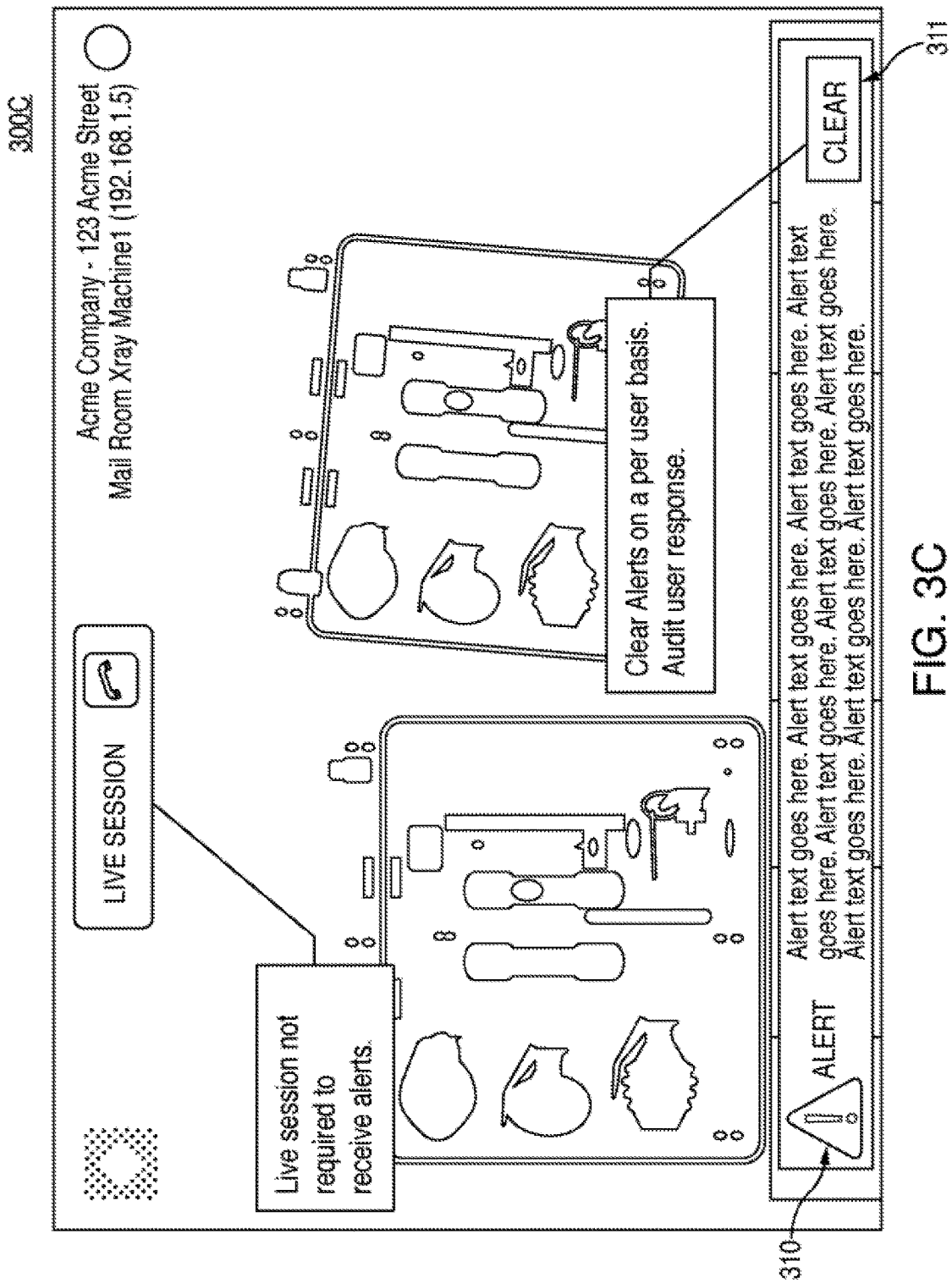
FIG. 3C illustrates an exemplary interface that may be displayed on a local workstation in response to receiving an alert message from a remote expert in accordance with certain embodiments of the present invention.
Figure 3D:
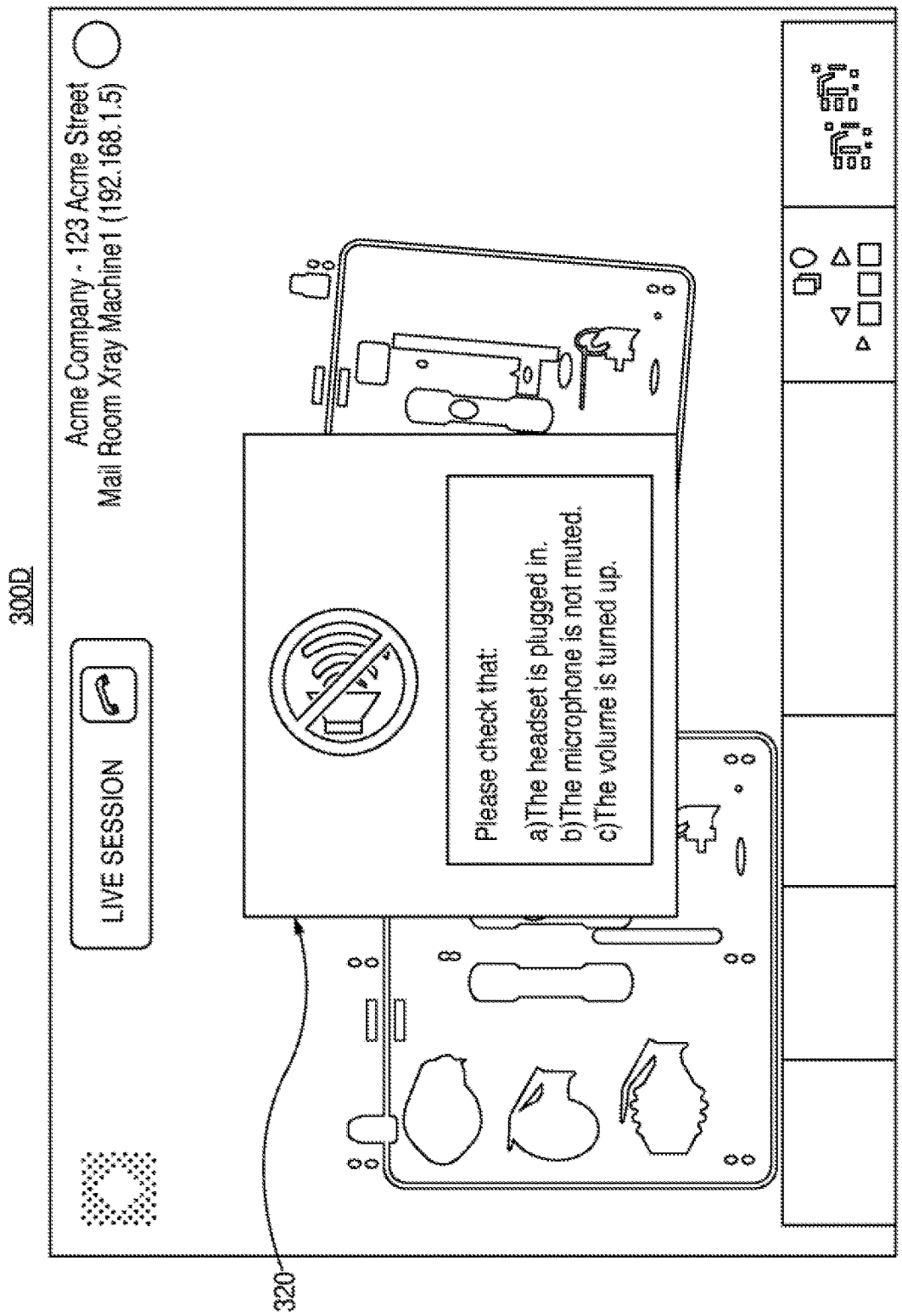
FIG. 3D illustrates an exemplary interface that may be displayed on a local workstation in response to receiving a pictogram from a remote expert in accordance with certain embodiments of the present invention.

FIG. 3D illustrates an exemplary interface 300D which may be displayed on a local workstation 110 that includes a pictogram 320 notifying the local operator 101 that the remote expert 131 is unable to hear the local operator 101. The pictogram 320 may include an icon of a disabled speaker and textual instructions for attempting to correct the issue. Similar pictograms may be transmitted by the remote expert 101 or local operator 101 to convey other messages as well.

The language preference of a local operator 101 or remote expert 131 who is receiving a pictogram may be utilized by the connection module 250 to select the content of the pictogram that is to be displayed to the recipient. For example, consider a scenario in which a remote expert 131 speaks English and a local operator 101 speaks Spanish, and the remote expert 131 wishes to convey a message to the local operator 101 notifying the local operator 101 that the remote expert 131 is unable to hear the local operator 101. In order to convey the message, the remote expert 131 may select a pictogram for conveying this message (e.g., which may be similar to the pictogram illustrated in FIG. 3D) from a list of available pictograms. The pictogram may be displayed to the remote expert 131 in English if the language preference of the remote expert 131 is English (assuming the pictogram includes text and not just icons or graphics). In response to selecting a send button, the server 150 receives a request to transmit a pictogram to the local operator 101 to inform the local operator 101 that the remote expert 131 is unable to hear the local operator 101. Before transmitting a pictogram to the local operator 101, the connection module 250 may determine the language of the local operator 101 (i.e., Spanish) by analyzing the attribute information 212 and selecting corresponding content for the pictogram that conveys the message in Spanish.

Thus, for each message that is the subject of a pictogram, the server 150 may store content for conveying the message in a plurality of different languages. A remote expert 131 or local operator 101 can simply select a message to be conveyed to the other party and the connection module 250 will automatically transmit a pictogram having content that is able to convey the message in a language that is understood by the receiving party.

In certain embodiments, the party sending the pictogram can specify the language of the pictogram that will be displayed to a local operator 101 or remote expert 131 who is receiving a pictogram. However, the language preference of the receiving party may be utilized to select a default language for the pictogram.

Figure 3E:
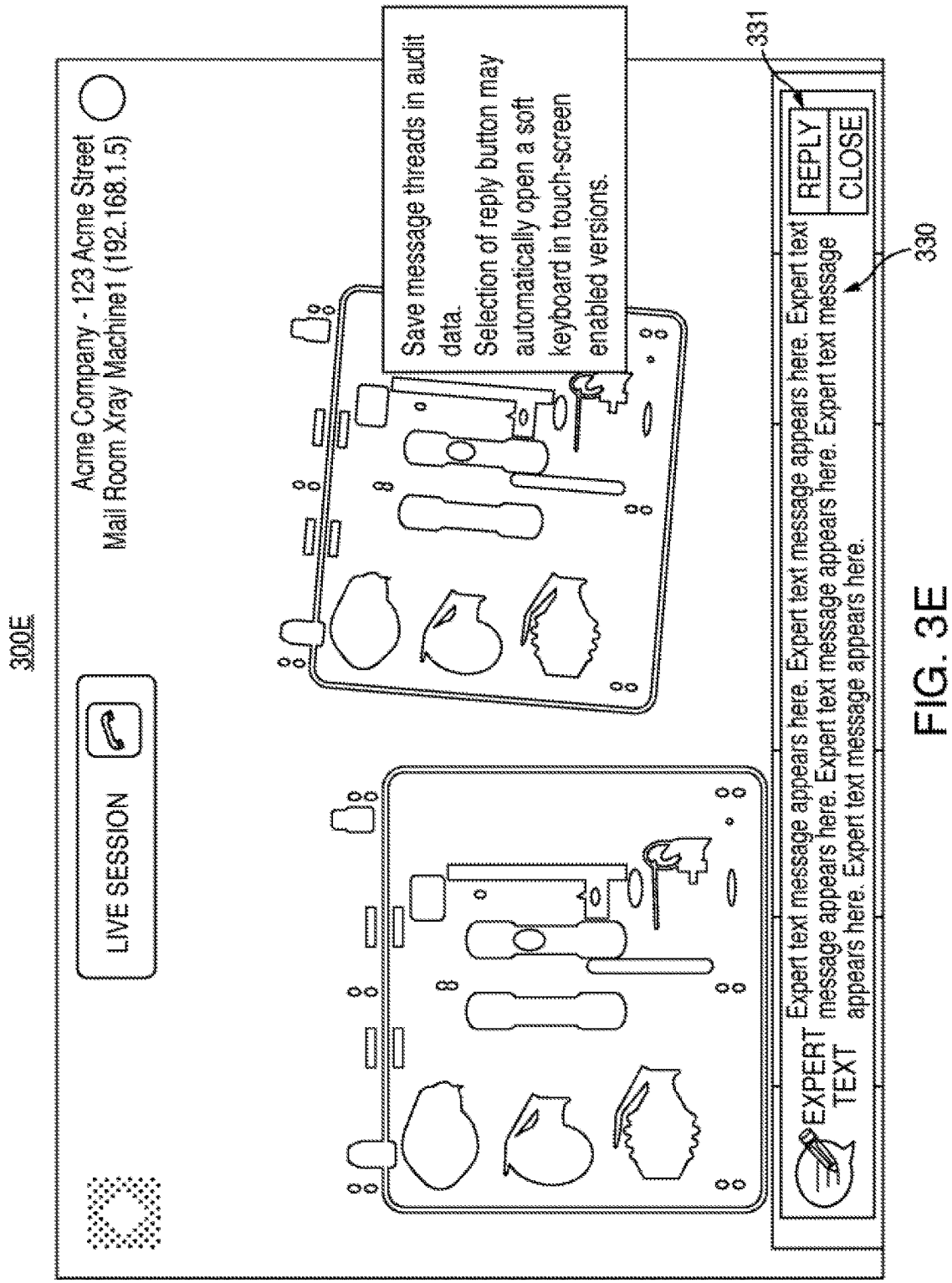
FIG. 3E illustrates an exemplary interface that may be displayed on a local workstation in response to receiving a text message from a remote expert in accordance with certain embodiments of the present invention.
Figure 3F:
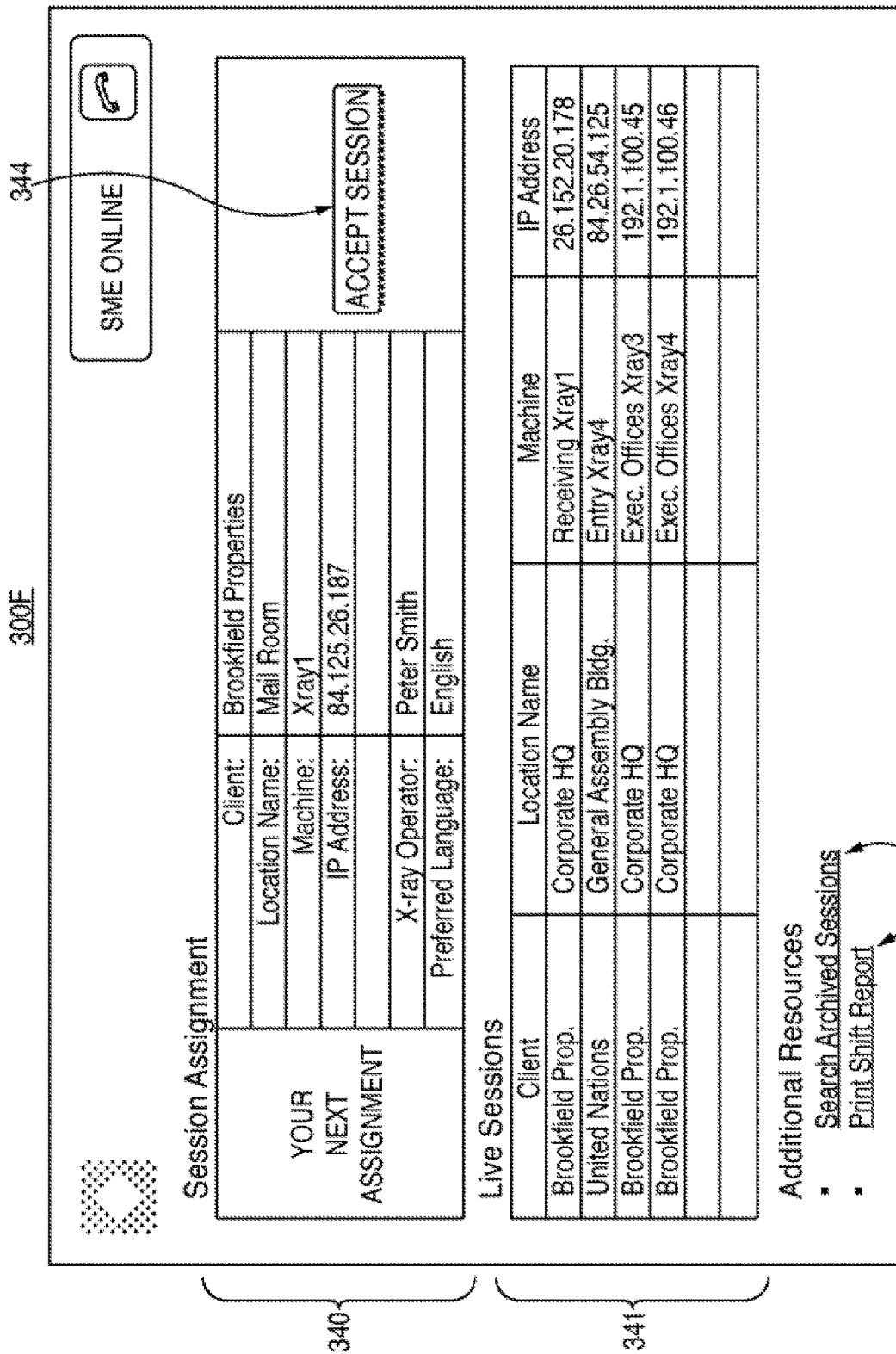
FIG. 3F illustrates an exemplary management interface that may be displayed on a remote expert device in accordance with certain embodiments of the present invention.
Figure 3G:
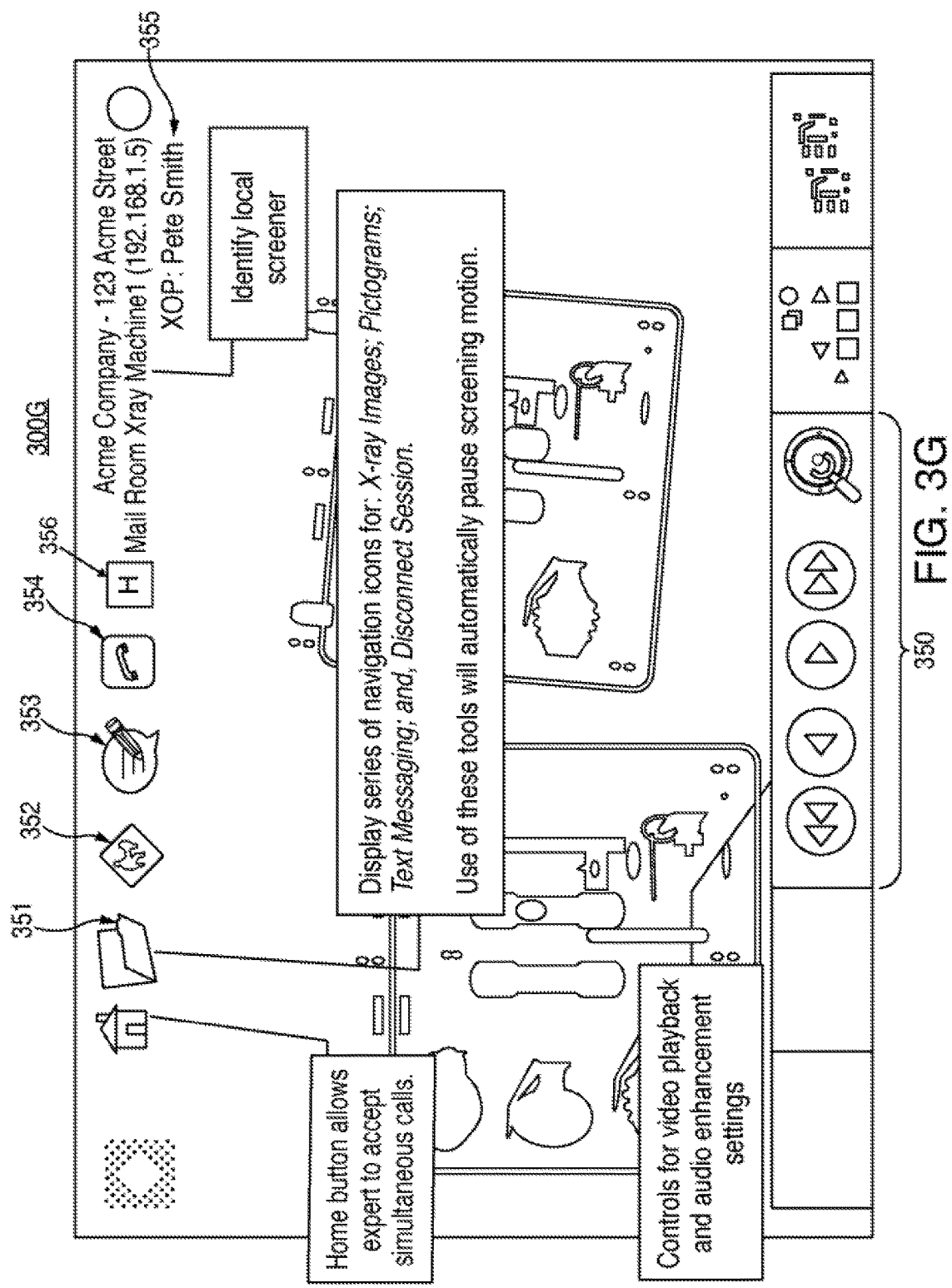
FIG. 3G illustrates an exemplary interface that may be displayed on a remote expert device while a request for assistance from a local operator is being handled in accordance with certain embodiments of the present invention.
Figure 3H:
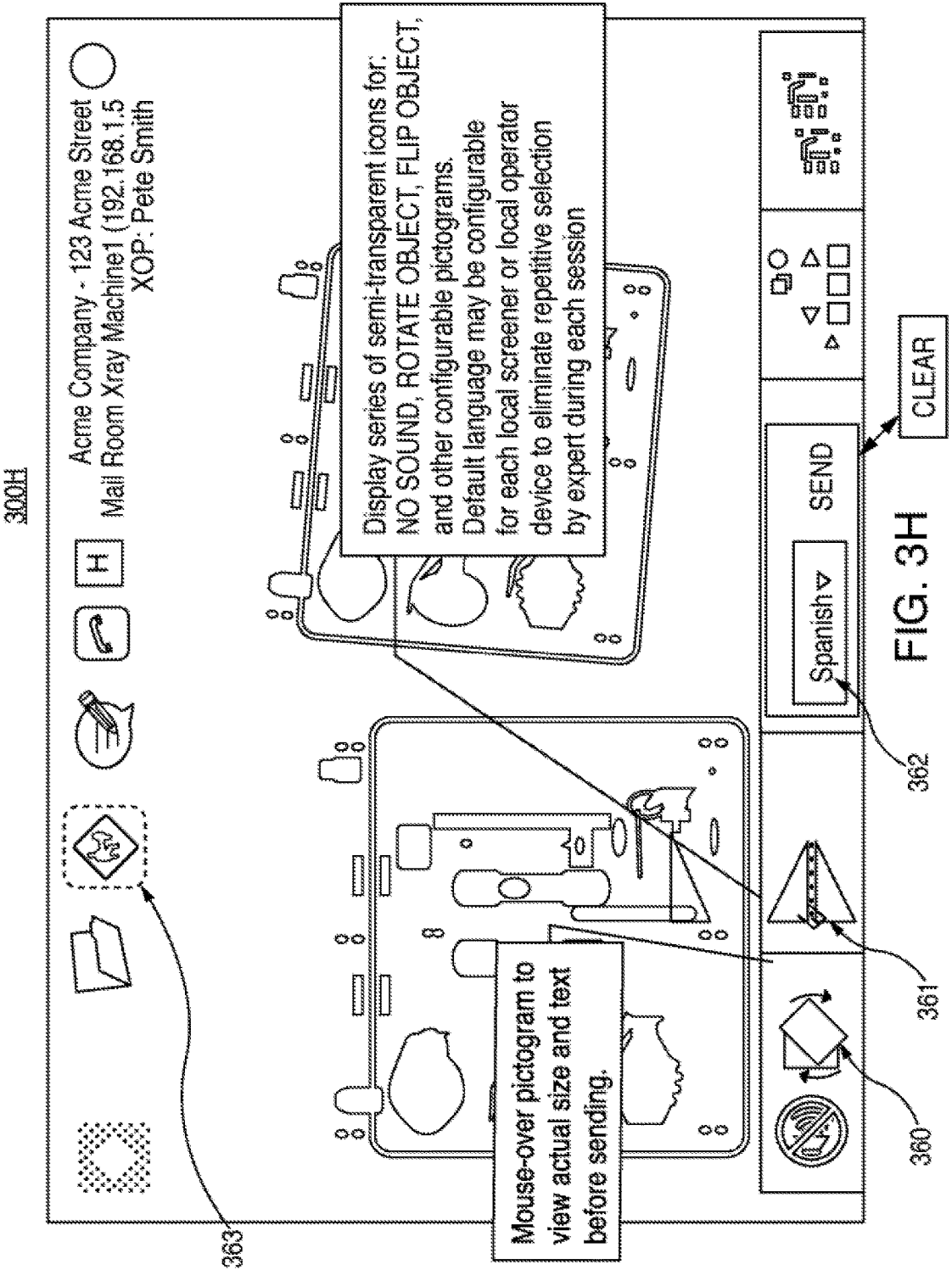
FIG. 3H illustrates an exemplary interface that may be displayed on a remote expert device for transmitting a pictogram to a local workstation in accordance with certain embodiments of the present invention.

FIG. 3H illustrates an exemplary interface 300H that may be displayed on a remote expert device 130 for transmitting a pictogram to a local workstation 110. The interface may be displayed in response to selecting a pictogram option 363 from the menu displayed on the top of the interface. The bottom of the interface includes a toolbar that permits a user to select a pictogram, customize the content of a pictogram, specify the language of the receiving party and send the pictogram. A first selectable option 360 on the toolbar permits the user to view the pictogram that will be transmitted. A second selectable option 361 permits the user to customize the pictogram. For example, a user may customize the icons, text, colors or multimedia features included in a pictogram.

The toolbar also includes a language selection option 362 that permits the user to select a language. When the pictogram is displayed to the receiving party, the pictogram will be displayed in the selected language. In certain embodiments, the language preference data for the receiving party (which is stored in the attribute information 212) may be utilized to select a default language for the language selection option 362. The user transmitting the pictogram may alter the default language if desired. After the user has selected and customized a pictogram, the user may select the send button to transmit the pictogram to the receiving party.

As can be seen, the language attributes stored in the attribute information 212 can be utilized to pair local operators 101 with remote experts 131 based on a common language or can also be utilized to facilitate communication between local operators 101 and remote experts 131 who do not speak the same language. Since communication between the local operator 101 and the remote expert 131 is crucial in resolving potential security threats, the use of the language attribute information by the connection module 250 can serve an important role with respect to overcoming language barriers that may be exist between parties and permitting potential security threats to be resolved quickly and efficiently.

In addition to the overcoming language barriers which may exist between local operators 101 and remote experts 131, the pictograms also serve an important role in the sense that the pictograms are able to convey an unambiguous message and provide a redundant means for communicating the message. While a remote expert 131 and local operator 101 may be permitted to communicate in other ways (e.g., voice or text), messages may be missed or misinterpreted for a variety reasons. For example, a lack of communication may exist due to technical failures (e.g., a bad connection or faulty equipment), personal disabilities or traits (e.g., one party does not speak clearly or has a hearing disability) or simply because one party was not paying close attention to the task at hand. However, the pictograms are able to convey a clear message utilizing both graphics and text. For example, even if the pictogram 320 in FIG. 3D was received by someone who did not speak English, the recipient of the pictogram 320 would immediately understand the message being conveyed by simply viewing the icon of the disabled speaker. The extra layer of clarity and redundancy provided by the pictograms can help to provide an expedited evaluation of potential security threats and a higher level of certainty that appropriate actions will be taken to handle potential security threats.

While the pictograms provide a very useful form of communication that can help to reinforce and clarify a particular message, the server 150 may permit a local operator 101 and remote expert 131 to communicate in other ways as well. In certain embodiments, a local operator 101 and remote expert 131 may communicate via a voice connection and/or a video conferencing connection. The parties may also communicate using a messaging feature such as an instant messenger.

FIG. 3E illustrates an exemplary interface 300E that may be displayed on a local workstation 110 in response to receiving a text message 330 from a remote expert 131. A local operator 101 may select a reply option 331 for responding to the text message 330. If the local workstation 110 is a touch screen device, selection of the reply option 331 may result in a soft keyboard (e.g., a virtual keyboard implemented in software) being displayed to the local operator 101. Remote experts 131 may receive and respond to messages in a similar manner. Either party may initiate the sending of a message 330 by selecting a messaging option 353 from a menu displayed on the local workstation 110 or the remote expert device 130. FIG. 3G, which is discussed in further detail below, illustrates an exemplary messaging option 353.

The attribute information 212 and/or dialing plans 205 may be utilized by the server 150 to facilitate the selection of remote experts 131 for handling requests. This information may be utilized to associate remote experts 131 (or remote expert devices 130) with expert groups 175 that are specified in dialing plans 205 for one or more screening locations 120, customers, local operators 101 and/or or local workstations 110. For example, it may be preferred that a particular expert group 175 handles requests from a first screening location 120 (e.g., an airport) while a second expert group 175 handles requests from a second screening location 120 (e.g., a mailroom). Likewise, it may be preferred that a particular expert group 175 handles a first type of request for assistance (e.g., threat assessment requests), while another expert group 175 handles other types of requests (e.g., test requests and diagnostic requests). The reason for allocating a subset of remote experts 130 to a particular screening location 120 or to particular types of requests may be based on expertise with handling particular situations, languages spoken, geographic locations or for any other reason.

The attribute information 212 may also be utilized to update software on a local workstation 110 or remote expert device 130. As mentioned above, the attribute information 212 may indicate the version of software which is running on the local workstation 130 and the remote expert devices 130. Thus, each time a local workstation 110 or remote expert device 130 connects to the server 150 or a request for assistance is transmitted to the server 150, the server 150 may determine whether the latest version of software is installed on the local workstation 110 or remote expert device 130. If it is determined that a local workstation 110 or remote expert device 130 does not have the latest version of software, the server 150 may push or otherwise provide the latest version of the software for installation. This can help to ensure compatibility between the software running on the local workstations 110 and remote expert devices 131.

In addition to storing dialing plan data 205, attribute information 212 and pictograms, the database 210 illustrated in FIG. 2 also stores audit data 213. The audit data 213 includes various types of information associated with requests for assistance that are submitted by a local operator 101. For example, the audit data 213 may indicate the time that a request was submitted, the type of request that was submitted (e.g., threat assessment request, test request or diagnostic request), the amount of time it took to resolve the request, the local operator 101 who submitted the request, the local workstation 110 that submitted the request, the screening location 120 associated with the request, the dialing plan 205 associated with the origin of the request, the remote expert 131 and expert group 175 that handled the request, the remote expert device 130 that responded to the request, any remote experts 131 who received the request but who did not respond to the request, any remote experts 131 and devices 130 that provided secondary assistance to handle a request, and the result of the expert's evaluation (e.g., true security threat or not a security threat). The audit data 213 may further include copies of scanning data (e.g., images or video) that was transferred from a local operator 101 to a remote expert 131, as well as any recordings or data associated with communications (e.g., via voice, text or pictograms) between the local operator 101 and the remote expert 131. The audit data 213 may also include data associated with canine detection units 180 that assisted with resolving requests. For example, the audit data 213 may identify the particular canine and handler in the unit 180 that assisted with resolving the request, and may indicate the type of security threat that was sensed by the canine.

The audit data 213 may be useful for a variety of different purposes. For example, the audit data 213 may be utilized to train remote experts 131 or local operators 101. The audit data 213 may also be utilized to evaluate the performance of remote experts 131 or local operators 101. The audit data 213 may further be utilized to circulate alerts to screening locations 120 about items which pose security threats or items which appear to pose security threats, but which are not true security threats.

The audit data 213 may also be utilized by a reporting module 230 to generate a variety of different reports. The reports may be provided digitally or as a hard copy (e.g., paper copy). One type of exemplary report may be specific to each screening location 120. For example, the report may include statistics and other types of useful data related to activities that occurred at a screening location 120 during a particular time interval (e.g., over the course of a week, month or year). The report may indicate the number of items that were inspected at the screening location 120, the number of number of times requests were submitted to remote experts 131 for assistance (possibly sub-divided into categories for each type of request), the number and types of requests handled by one or more expert groups 175, the number of requests which resulted in the detection of a true security threat, the number of requests which were not deemed to be a true security threat, the average time it took to resolve a request, the canine detection units 180 that assisted with resolving the requests, and any other data related to detecting threats at the screening location 120.

The report may also include detailed information for particular requests (e.g., requests that resulted in the detection of a true security threat). In certain embodiments, the report may also provide recommendations to a screening location 120. For example, the report may provide recommendations for increasing the number of security or screening personnel, training local operators 101, evaluating threats, reducing delays at checkpoints or other types of recommendations.

The reporting module 230 may also be utilized to generate a detailed report about a particular request that was received by a remote expert 131. The report may include any type of audit data 213 that was generated for the request. For example, it may identify the local operator 101 who submitted the request, the remote expert 131 that responded to the request, the expert's evaluation of the request, the type of request, etc. The report may further include images (e.g., actual photographs as well as X-ray images) of the items which were being evaluated and copies of any communications that took place between the local operator 101 and the remote expert 131.

In addition to the reports described above, it should be recognized that the reporting module 230 may generate other types of reports as well. For example, the reporting module 230 may generate reports which are specific to particular remote experts 131, local operators 101, screening devices 160, etc.

The exemplary server 150 illustrated in FIG. 2 also includes a set of admin controls 220. The admin controls 220 include functions which are accessible to the remote experts 131 (or other administrators and individuals associated with the primary operations center 140 and/or satellite operations center 125) and which permit the remote experts to perform a variety of different tasks including tasks for configuring and managing screening locations 120, specifying attribute information 210, associating remote experts 131 with expert groups 175, creating and updating dialing plans 205, transmitting alerts to workstations 110, and configuring remote expert devices 130. In certain embodiments, the functionality of the reporting module 230 may also be incorporated into the admin controls 220.

One feature of the admin controls 220 may include a set of customer controls for configuring and managing screening locations 120 and local workstations 110. The customer controls may permit a remote expert 131, system administrator, or other user to incorporate additional customers and screening locations 120 into the threat detection system 110. For each screening location 120, the customer controls may also permit a user to set up new workstations 110 and screening devices 160 for use with the threat detection system 100, and to create new accounts or profiles for local operators 101. The customer controls may further permit the user to create, edit, delete or update expert groups 175 and dialing plans 205. The customer controls may include graphical wizards that permit a non-technical user to easily navigate through a series of interfaces in order to incorporate new expert groups 175, dialing plans 205, screening locations 120, workstations 110 and screening devices 160 into the system 100.

The customer controls may further permit a user to associate attribute information 212 with screening locations 120, workstations 110, screening devices 160 or local operators 101. For example, the admin controls 220 may permit the user to associate a language preference (or a particular set of pictograms) and time zone with a local operator 101, workstation 110 or screening location 120. The admin controls 220 can also be utilized to identify a particular subset of remote experts 131 to handle requests from a local operator 101, local workstation 110 or screening location 120.

The admin controls 220 may also include a set of expert device controls which are similar in some sense to the customer controls. For example, the expert device controls may allow a user to set up and add new remote expert devices 120 to the threat detection system, manage accounts or profiles for remote experts 131 and specify a preferred language for a remote expert 131, remote expert device 130 or operations center 140.

Another feature of the admin controls 220 permits a remote expert 131 or other user to create, edit or delete pictograms. For example, the remote expert 131 can incorporate icons, images, text, audio, video clips, animations and other content into a pictogram. Pictograms can be created for any language. The admin controls 220 may permit the user to define the content of a pictogram for a plurality of different languages and associate the different pieces of content with the pictogram.

In the case that content for a pictogram is not available in a particular language, the admin controls 220 may permit the remote expert 131 to specify the content that will be associated with the language. For example, the remote expert 131 may specify that only icons or images should be displayed and that the text should not be displayed. Alternatively, the remote expert may specify that content associated with a different language should be utilized to populate the pictogram that is displayed.

The admin controls 220 may also be configured to create, edit and delete alert messages. In some cases, the alert messages may provide information about actual security threats that were detected at particular screening locations 120. The alert messages may also provide information about potential security threats which may appear to present a security threat (e.g., which may appear to be an explosive, bomb or gun), but which were determined to be a non-threat or a false alarm. The alert messages may be transmitted to both local operators 101 and remote experts 131. In certain embodiments, a recipient of the alert message is able to acknowledge receipt of the message and the acknowledgment is recorded in the audit data 213 stored on the server 150.

The admin controls 220 may also be configured to create, edit and delete alert messages that are associated with monitoring the expert groups 175 and dialing plans 205. For example, the admin controls 220 can create an alert that notifies administrators or personnel at the primary operations center 140 and/or 125 when an expert 131 or expert group 175 fails to answer a request (e.g., when an expert 131 or expert group 175 is designated as idle), when an expert group 175 is receiving a large number of requests above a particular threshold or similar types of alerts. Any of the alerts may be sent automatically by the server 150 to ensure real-time readiness of backup experts 131 and/or backup expert groups 175.

FIG. 3C illustrates an exemplary interface 300C that may be displayed on a local workstation in response to receiving an alert message. As shown therein, an alert message 310 is displayed at the bottom of the interface. In certain embodiments, a user may select an option for viewing additional details about the alert (e.g., images and other information about items that are security threats). The user may select a clear option 311 to remove the alert message. In response to selecting the clear option 311, an acknowledgment may be recorded in the audit data 213 stored on the server 150 which indicates that the user has received the alert message. Similar alert messages may be displayed on remote expert devices 130.

The admin controls 220 may also provide a management interface that permits experts 131 or other users to view information relevant to prior and ongoing requests for assistance. For example, the management interface may display data or statistics associated with ongoing requests currently being handled, requests that were cleared (i.e., not determined to be a security threat), requests that were determined to be an actual security threat, average time to handle a request, total number of requests for a given time period (e.g., a day or week) and other types of similar information.

In certain embodiments, the management interface may also include links (e.g., hyperlinks) that can be selected by the user to view detailed information about a particular request. For example, in response to selecting a link that is associated with a particular request, the audit data 213 associated with the request may be retrieved from a database 210 on the server 150 in order to display the detailed information about the request to the user.

FIG. 3F illustrates an exemplary management interface 300F that may be displayed to a remote expert 131 (or other individual at the primary operations center 140 or satellite operations center 125). The management interface includes a live session section 341 that displays information about all requests that are currently being handled by remote experts 131. For each ongoing request, the live session section 341 lists the name of the client or company that submitted the request, the particular screening location 120 at the company from which the request originated, the type of screening device 160 that is being utilized by the local operator 101 who submitted the request, and the internet protocol (IP) address of the local workstation 110 that submitted the request. In certain embodiments, one or more remote experts 131 may join an ongoing session associated with a request by selecting the request in the live session section 341.

The management interface also includes a session assignment section 340 that permits a remote expert 131 to accept an unanswered request for assistance from a local operator 101. As explained above, the server 150 may select a remote expert 131 in response to receiving a request for assistance and invite the remote expert to accept the request. The selected remote expert 131 may accept the request by selecting the accept session option 344 located in the session assignment section 240 of the interface. Even before the remote expert 131 accepts the request, the remote expert 131 is able to identify the name of the client or company that submitted the request, the particular screening location 120 at the company where the request originated, the type of screening device 160, the IP or network address of the local workstation 110 that submitted the request, the name of the local operator 101 that submitted the request and the preferred language of the local operator 101.

The management interface may also include an archived sessions option 342 that permits the remote expert to access prior requests that were handled along with any audit data 213 that is stored in the server database 210 for the requests. A shift report option 343 further permits the remote expert 131 to access the reporting module 230 and print various types of reports.

FIG. 3G illustrates an exemplary interface 300G that may be displayed on a remote expert device 130 in response to accepting a request for assistance from a local operator 101 (e.g., in response to selecting the accept session option 344). The top portion of the interface includes a request details section 355 and a menu of selectable options. The request details section 355 displays the name and address of the company that submitted the request, the screening location 120 at the company where the request originated (e.g., in the case that a company has more than one screening location), the IP address of the local workstation 110 that submitted the request and the name of the local operator 101.

The menu on the interface includes a scanning data option 351 that permits a remote expert 130 to view X-ray images, videos or other types of scanning data that is generated by the screening device 160 being operated by the local operator 101. A pictogram option 352 permits a remote expert 131 to select and send a pictogram to the local operator 101 who submitted the request. A messaging option 353 permits the remote expert 131 to access an instant messaging function or similar feature that permits text messages to be exchanged with the local operator 101. A request termination option 354 permits the remote expert 131 to end a live session with the local operator 101. In certain embodiments, the menu may further include a home button option that permits the remote expert to return to a management interface (e.g., as shown in FIG. 3F). Returning to the management interface may permit the remote expert 131 to accept additional requests, thus permitting the remote expert 131 to simultaneously handle multiple requests.

In certain embodiments, the interface 300G may also include an additional assistance option 356 that permits a remote expert 131 to request the assistance of one or more additional remote experts 131 in order to resolve a request. This may be particularly useful in the event that a remote expert 131 who has accepted a request desires the assistance of a more experienced expert or an expert that specializes with certain types of threats (e.g., who specializes in detecting explosives). As mentioned above, the dialing plan associated with the origin of the request may be used to select the remote expert groups 175 and/or remote experts that will receive the request for assistance. An interface similar to the one shown in FIG. 3G may be displayed on the device 130 of an expert that has accepted the request for assistance. The interfaces displayed to both the original expert 131 and the second expert 131 that is providing assistance may include additional options that permit the experts to communicate privately without the knowledge of the local operator 101 that submitted the request. In certain embodiments, the interfaces displayed to the local operators 101 on the local workstations may also include an assistance option 356 that permits the local operators 101 to request the assistance of one or more additional experts 131 in resolving a request.

In certain embodiments, the interface displayed to the remote expert 131 is a live audio/video feed that displays what is shown on the display of the local workstation 110. For example, as a local operator 101 manipulates images or other scanning data on the display of the local workstation 110, this can be viewed in real-time by the remote expert 131. A set of controls 350 permits the remote expert 131 to adjust video and audio settings associated with the audio/video feed. For example, the controls 350 may permit the remote expert to rewind, pause or fast forward through the feed. The controls 350 may further permit the remote expert 131 to adjust volume settings and other audio settings.

Figure 3I:
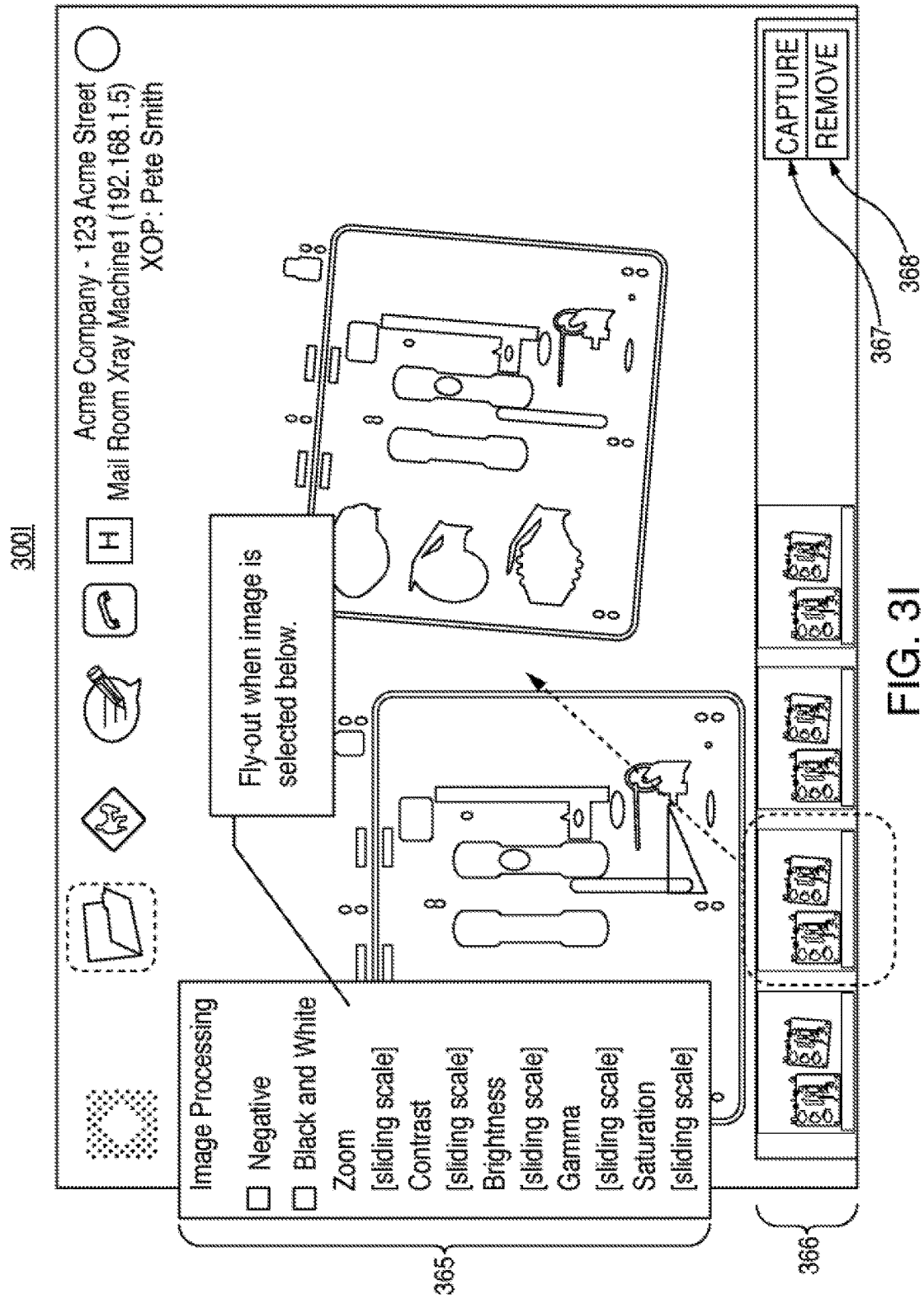
FIG. 3I illustrates an exemplary interface that may be displayed on a remote expert device for capturing and manipulating images while handling a request for assistance from a local operator in accordance with certain embodiments of the present invention.

FIG. 3I illustrates an exemplary interface 300I that may be displayed in response to selecting the scanning data option 351 on the menu located at the top of the interface. As mentioned above, scanning data option 351 provides a remote expert 131 with access to X-ray images and other scanning data that may be generated by the screening devices 160. In this exemplary interface, a plurality of X-ray images are displayed in a thumbnail portion 366 of the interface. The remote expert 131 may select one of the images and the selected image will be displayed in the main portion of the interface.

In response to selecting the image, a set of image manipulation controls 365 may be displayed. The image manipulation controls 365 may permit the remote expert 131 to adjust a variety of different settings for the image. For example, the image manipulation controls 365 may permit the remote expert 131 to render the image in color, black and white or as a negative. The remote expert 131 may also zoom in and out on portions of the image and adjust the contrast, brightness, gamma and saturation values for the image. The image may be manipulated in other ways as well.

After the remote expert 131 has finished manipulating the image, the remote expert 131 may select a capture option 367 to generate a new image that includes the adjustments that were made using the image manipulation controls 365. A remove option 368 further permits the remote expert 131 to delete images in the thumbnail portion 366 of the interface. Any images which remain in the thumbnail portion 366 when the session has been terminated will be stored in the audit data 213 on the server 150 and associated with the request.

Figure 3J:
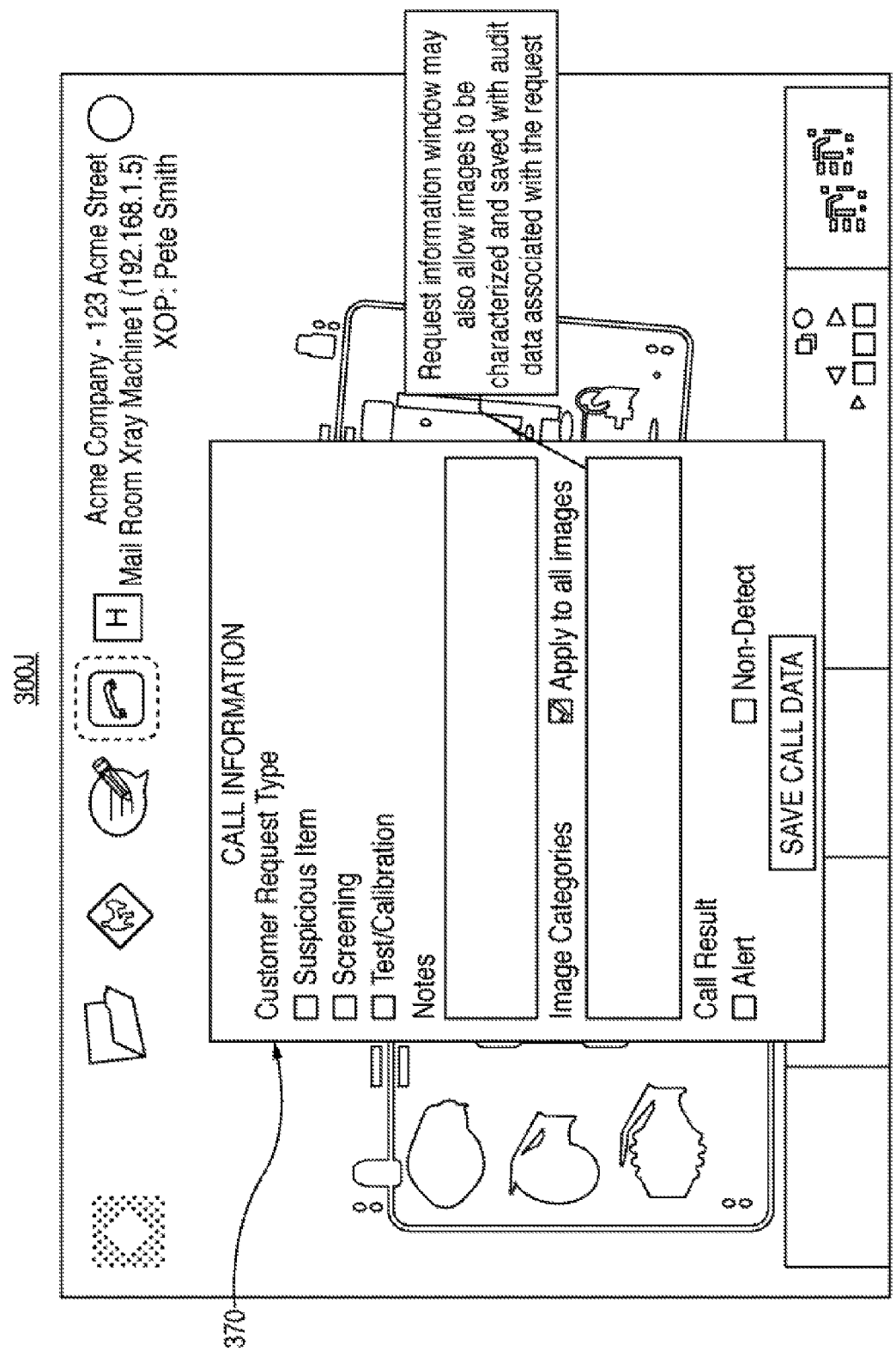
FIG. 3J illustrates an exemplary interface that may be displayed on a remote expert device when terminating a session with a local operator in accordance with certain embodiments of the present invention.

FIG. 3J illustrates an exemplary interface that may be displayed on a remote expert device 130 when terminating a session with a local operator 101. As explained above, a remote expert 131 may terminate a session by selecting a request termination option 354 from the menu located on the top portion of the interface. In response to selecting the request termination option 354, a request information window 370 may be displayed to the remote expert 131. The request information window 370 may include input elements for collecting information about the request. For example, the request information window 370 may permit the remote expert 131 to identify the request type (e.g., threat assessment, test/calibration, screening or diagnostics) and provide a description of the request. The remote expert 131 may also categorize the images or other scanning data 160 that were reviewed during the request.

The request information window 370 may further include a section which permits the remote expert 131 to specify the evaluation or conclusion that was reached by the remote expert 131. Thus, in the context of a threat assessment request, this may include indicating whether or not the request resulted in the detection of an actual security threat. On the other hand, if the request is for a diagnostics problem, this may include indicating whether or not the problem was solved. Similarly, in the context of a test or calibration request, this may include indicating whether or not the test or calibration was successful.

Figure 4:
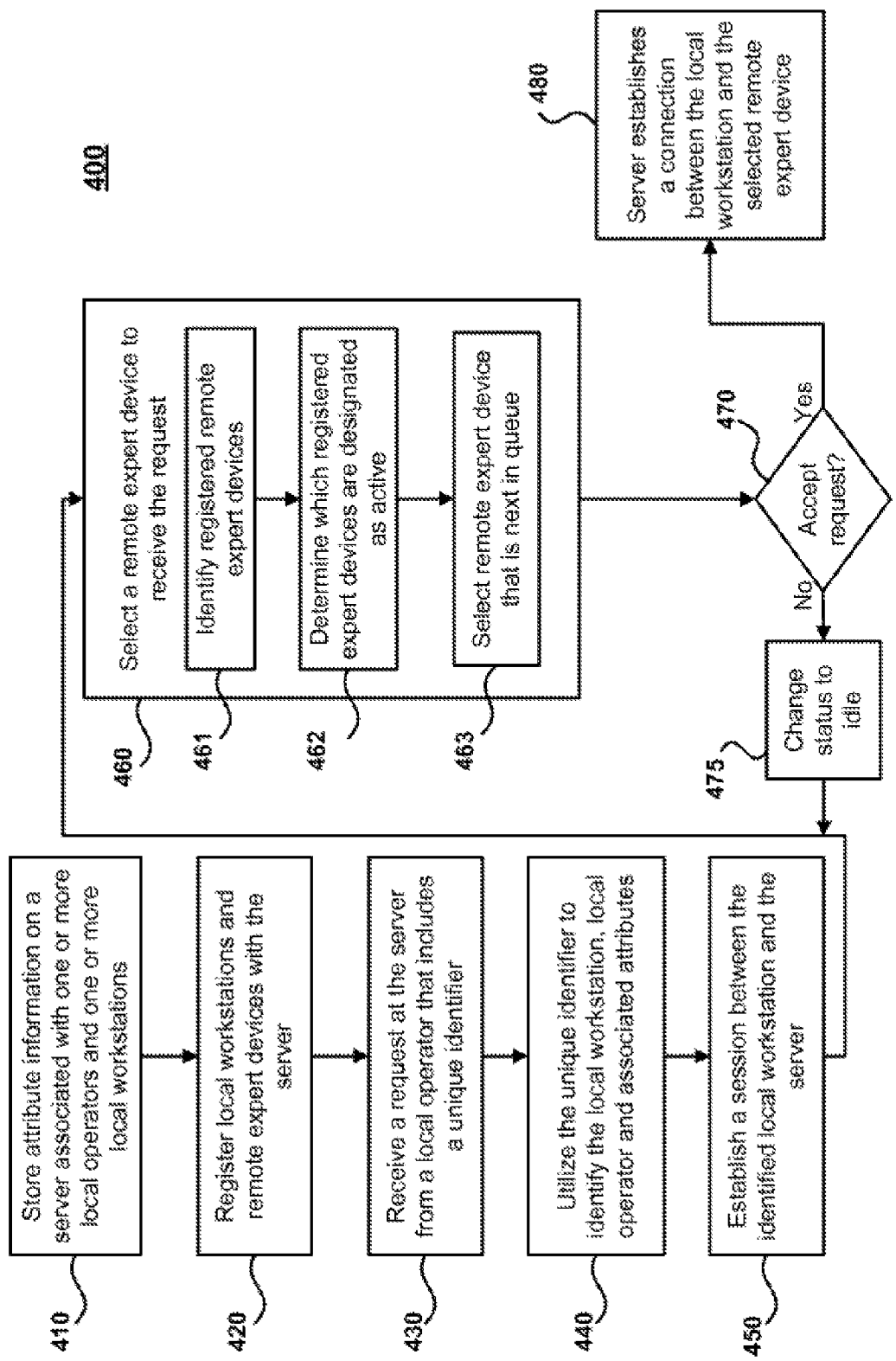
FIG. 4 is a flow chart of a method for establishing a connection between a local workstation and a remote expert device in accordance with certain embodiments of the present invention.

FIG. 4 is a flow chart illustrating a method 400 for establishing a connection between a local workstation 110 and a remote expert device 130 in accordance with certain embodiments of the present invention. In certain embodiments, the method 400 may be executed by the connection module 250 on the server 150, possibly in conjunction with other components of the threat detection system 100. Initially, attribute information 212 associated with one or more local operators 101 and one or more local workstations 110 may be stored on a server 150 (step 410). For example, attribute information 212 may be stored for each local operator 101 that indicates the individual's name, experience level and language preference, as well as for each local workstation 110 that indicates the screening location of the workstation, the IP address of the device, the company associated with the screening location of the workstation 110, the version of the software installed on the workstation, and the type of screening device 160 that is connected to the local workstation 110. In certain embodiments, this step may further involve storing attribute information 212 on the server 150 for remote experts 131, remote expert devices 130, screening devices 160 and/or other components of the threat detection system.

In certain embodiments, the admin controls 220 may be utilized by a remote expert 131 or other user in order to integrate new or additional local workstations 110, local operators 101, screening locations 120, screening devices 160, remote expert devices 130 and/or remote experts 131 into the threat detection system. Thus, the attribute information 212 may be stored on the server 150 each time a new component or individual is integrated into the system. The attribute information 212 may be stored on the server 150 in other ways as well.

Next, the local workstations 110 and the remote expert devices 130 may register with the server 150 (step 420). For example, each time a local workstation 110 or remote expert device 130 is being utilized, a local operator 101 or remote expert 131 may enter authentication credentials (e.g., a username and password) and the local workstation 110 or remote expert device 130 may register with the server 150. This permits the server 150 to determine all of the local workstations 110 and remote expert devices 130 that are currently being utilized by the threat detection system, as well as the identity of the individuals who are operating the devices.

A request submitted by a local operator 101 is then received at the server 150 which includes a unique identifier (step 430). As explained above, the request may relate to a threat assessment request, a test request or a diagnostics request. Other types of requests may be transmitted as well. A local operator 101 may submit a request by selecting an option (e.g., threat assessment request option 305) on an interface that is displayed on a local workstation 110. The server 150 utilizes the unique identifier submitted with the request to identify the local operator 101 and local workstation 110 that submitted the request, as well to identify the stored attribute information 212 for the local operator 101 and local workstation 110 (step 440).

A session is then established between the identified local workstation 110 and the server 150 (step 450). In certain embodiments, establishing a session may involve transmitting a token to the identified local workstation 110 and establishing the session when the local workstation 110 transmits the token back to the server 150.

Next, the server 150 identifies a remote expert device 130 to receive the request (step 460). In certain embodiments, the server 150 may select the remote expert device 130 by executing the sub-process shown in step 460. Specifically, the server 150 may identify all registered remote expert devices (step 461) and determine which of the registered expert devices 130 are designated as active (step 462). The server 150 may then identify the active expert device 130 that is queued to receive the next request (step 463). In certain embodiments, the expert device 130 that is next in the queue is the expert device 130 that is designated as active and for which the longest period of time has elapsed since the device received a request, accepted a request or concluded a request.

As an optional sub-step which is not shown in FIG. 4, the server 150 may utilize the language preference attributes of the local operator 101 who submitted the request and the remote experts 131 who are registered with the system to filter the list of active remote expert devices 130 or to adjust a weighting factor for selecting the remote expert device 130. For example, in some cases, the server 150 may not forward the request to a remote expert device 130 if the attribute information 212 for a remote expert 131 indicates that the remote expert 131 does not speak the same language as the local operator 101 who transmitted the request. In other cases, the language preference information may not exclude a remote expert device 130 from being selected altogether, but the language preference information may be considered as a factor in the selection process.

After the server 150 forwards the request to the selected remote expert device 130, a determination is made as to whether the selected remote expert device 130 accepted the request (step 470). If the selected remote expert device 130 did not accept the request, the server 150 changes the status of the remote expert device 130 from active to idle (step 480), and the method proceeds back to step 460 where the server 150 identifies another remote expert device 130 for receiving the request in the same manner described above. The server 150 may continue to loop in this manner until the request is accepted by a remote expert device 130.

If a selected remote expert device 130 accepts the request, the server 150 establishes a connection between the local workstation 110 that submitted the request and the selected remote expert device 130 (step 480). In certain embodiments, the connection may permit voice, text, data and/or video communication. The communication channels provided by the connection may permit the local operator 101 to communicate with the remote expert 131 to resolve the request.

Figure 5:
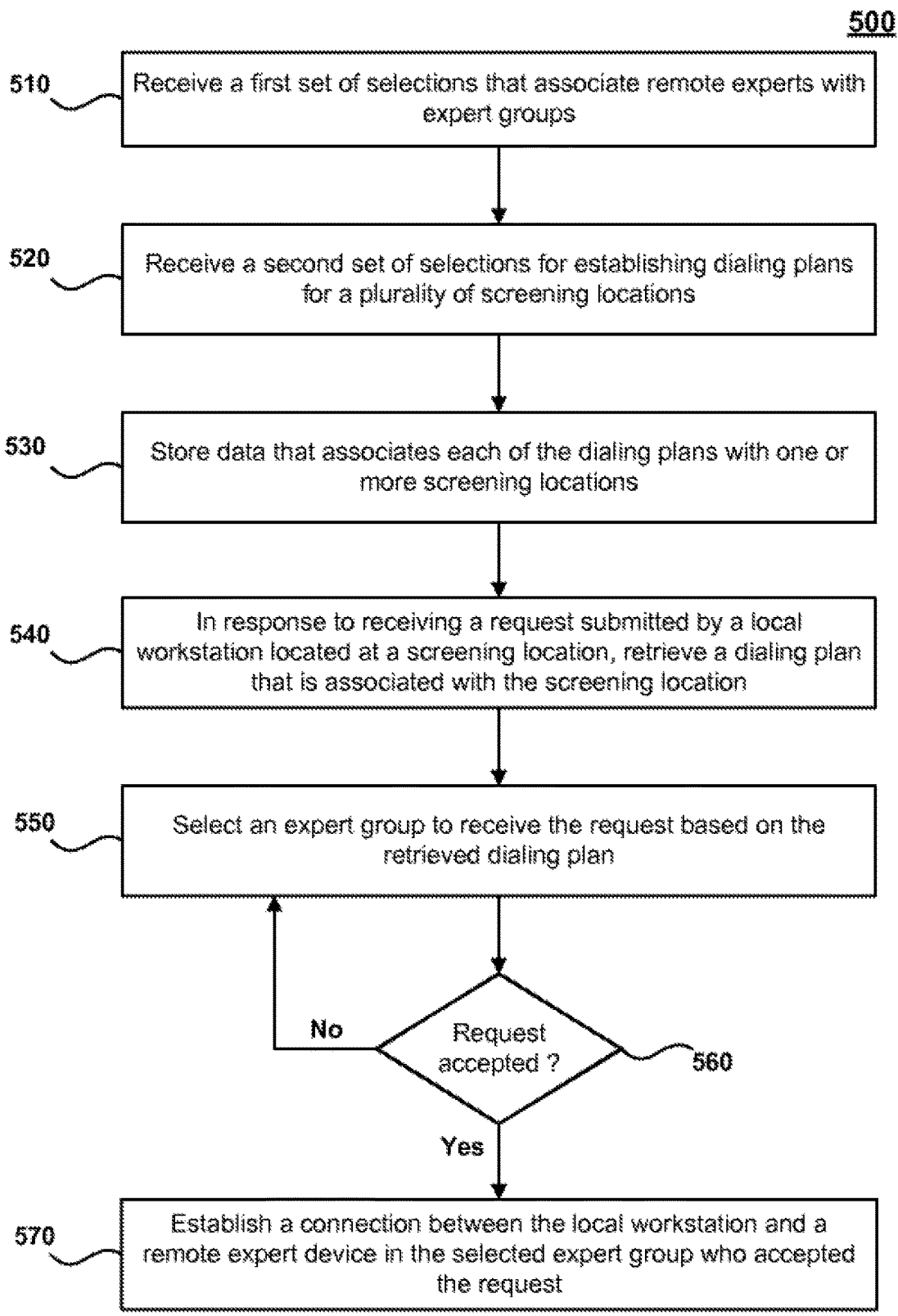
FIG. 5 is a flow chart of a method for establishing a connection between a local workstation and a remote expert device based on a dialing plan associated with the origin of the request in accordance with certain embodiments of the present invention.

FIG. 5 is a flow chart of a method 500 for establishing a connection between a local workstation 110 and a remote expert device 130 based on a dialing plan 205 associated with the origin of the request in accordance with certain embodiments of the present invention. In certain embodiments, this method 500 is executed by the server 150 illustrated in FIG. 1. It should be recognized that while the exemplary method 500 shown in FIG. 5 describes the use of dialing plans that are associated with screening locations 120, similar methods may be used in cases where the dialing plans are assigned to customers, local workstations 110 and local operators 101.

A first set of selections is received for associating remote experts 131 with expert groups 175 (step 510). For example, as shown in FIG. 1, expert groups 175 may be defined which include remote experts 131 located at a primary operations center 140 and a satellite operations center 125, as well as remote experts 131 that are not located at either operations center. The remote experts 131 can be grouped in any manner whatsoever (e.g., using the admin controls 220) and the data indicating the groupings may be stored on the server 150. It should be recognized that the expert groups 175 may identify either remote experts 131 (e.g., based on stored user profiles) or remote expert devices 130, and the terminology is used interchangeably herein.

Next, a second set of selections is received for establishing dialing plans 205 for a plurality of screening locations (step 520). For each dialing plan, the second set of selections may at least identify: (1) the expert groups 175 that are to be assigned to the dialing plan 205; (2) the screening locations 120 that use the dialing plans to handle routing of requests; and (3) a priority ordering of the assigned expert groups for receiving the requests (e.g., a hierarchal or sequential ordering as described above). In certain embodiments, a dialing plan 205 may specify a different priority ordering for each type of request.

Data is stored which associates each of the dialing plans with one or more screening locations (step 530). The data may be stored on the server 150 with the dialing plans 205 and/or stored on the local workstations 110 located at the screening locations 120. In response to receiving a request submitted by a local workstation 110 (or local operator 101) at a screening location 120, a dialing plan assigned to or associated with the location 120 is retrieved (step 540).

An expert group 175 is selected to receive the request based on the retrieved dialing plan that is associated with the screening location 120 (step 550). The expert group 175 is selected based on the priority ordering specified in the dialing plan and the status information for the expert groups 175 (e.g., which may indicate whether the expert groups 175 are idle or available). A determination is made as to whether the request was accepted by the selected expert group 175 (i.e., whether the request was accepted by any of the remote experts 131 and/or remote expert devices 130 included in the selected expert group 175) (step 560). In certain embodiments, each time an expert group 175 is selected to receive a request, a method 400 similar to that described above with respect to FIG. 4 may be used to select a remote expert device 130 or remote expert 131 assigned to the selected group 175 to receive the request. For example, the server 150 may initially select an expert 131 in the selected expert group 175 by determining which experts in the group 175 are available to handle the request (e.g., not idle, timed-out or currently servicing a different request) and selecting the expert that has not serviced a request in the longest period of time.

If the request was not accepted by the expert group 175, the method proceeds back to step 550 and the dialing plan 205 associated with the screening location is used to select another expert group 175 (e.g., based on the priority ordering and status information). On the other hand, if the request is accepted by the selected expert group 175, a connection is established between the local workstation 110 that submitted the request and a remote expert device 130 in the selected expert group 175 which accepted the request.

Figure 6:
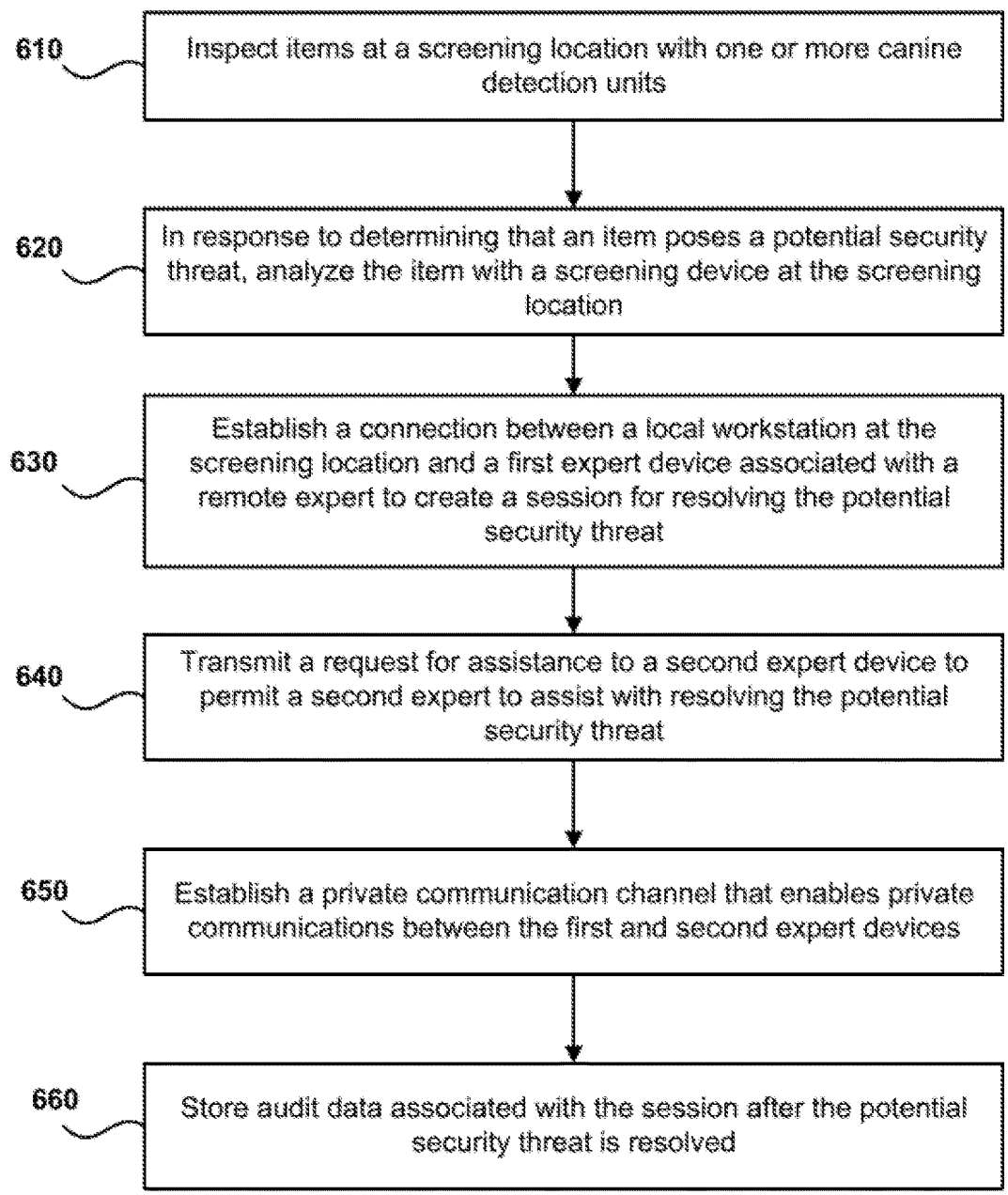
FIG. 6 is a flow chart of a method for implementing a comprehensive inspection procedure that utilizes canine detection teams and remote experts to detect threats in accordance with certain embodiments of the present invention.

FIG. 6 is a flow chart of a method 600 for implementing a comprehensive inspection procedure that utilizes canine detection units 180 and remote experts 131 to detect potential security threats at screening locations 120. Items are inspected at a screening location 120 with one or more canine detection units 180 (step 610). For example, a canine detection unit 180 may inspect luggage at an airport, packages at truck search and/or mail items in a mail room. The canine detection unit 180 may be include teams of canines and their handlers. The canines may be trained to detect explosives, narcotics, contraband or other security threats. To facilitate inspection of the items, a handler may position a dog near the items being inspected and the dog may lead the handler to certain items or areas. The handler may interpret certain behaviors of the canines to determine if the canines have detected a security threat.

In response to determining that an item poses a potential security threat, the item is analyzed with a screening device 160 at the screening location 120 (step 620). This may involve scanning the item to determine the density of the item and/or analyzing the item in other ways. Scanning data may be displayed to a local operator 101 on a local workstation 110 that is coupled to the scanning device 160. The local operator may review the scanning data and determine whether assistance of a remote expert 131 is necessary to resolve the potential security threat.

A connection is established between a local workstation 110 at the screening location 120 and a first expert device 130 associated with an remote expert 131 to create session for resolving the potential security threat (step 630). The local workstation 110 and the first expert device 130 may be in communication over a network 190 with a server 150 that facilitates the connection and establishes the session. The session enables a local operator 101 at the screening location 120 to communicate with the remote expert 131. Scanning data generated by the scanning device 120 may be transferred from the local workstation 110 to the first expert device 130. In certain embodiments, the connection may be established in the manner described above with respect to either FIG. 4 or 5.

A request for assistance is transmitted from the first expert device 130 to a second expert device 130 to permit a second expert 131 to assist with resolving the potential security threat (step 640). In certain embodiments, the second expert may be directly selected by the first expert or the second expert may be selected in a similar manner as described above with respect to FIG. 4 or 5 (e.g., using attribute information and/or dialing plans).

A private communication channel or connection is established that enables private communications between the first and second expert devices 130 (step 650). The private communications channel allows a multi-expert session to be conducted for resolving the potential security threat. In certain embodiments, the participation of the second expert 131 is not made known to the operator of the local workstation 110 (e.g., is not displayed on the local workstation and is otherwise hidden from the operator). Private communication channels or connections can be established with any number of experts 131 to assist with resolving the security threat.

After the potential security threat is resolved, audit data associated with the session is stored (step 660). In certain embodiments, the audit data may be stored on the server 150. As explained above, the audit data may include any data related to the session, including any data associated with the canine detection unit 180 that assisted with the request, any data associated with the private communication session established between the experts, and any data associated with the potential security threat.

While there have been shown and described and pointed out various novel features of the invention as applied to particular embodiments thereof, it will be understood that various omissions and substitutions and changes in the form and details of the systems and methods described and illustrated, may be made by those skilled in the art without departing from the spirit of the invention. Amongst other things, the steps shown in the methods may be carried out in different orders in many cases where such may be appropriate. Those skilled in the art will recognize, based on the above disclosure and an understanding therefrom of the teachings of the invention, that the particular hardware and devices that are part of the system described herein, and the general functionality provided by and incorporated therein, may vary in different embodiments of the invention. Accordingly, the particular system components shown in the figures are for illustrative purposes to facilitate a full and complete understanding and appreciation of the various aspects and functionality of particular embodiments of the invention as realized in system and method embodiments thereof. Those skilled in the art will appreciate that the invention can be practiced in other than the described embodiments, which are presented for purposes of illustration and not limitation.

What is claimed is:

1. A system for detecting security threats, the system comprising:
   at least one canine detection unit comprising one or more canines and one or more handlers that inspect items at screening locations to detect potential security concerns;
   a plurality of screening devices, wherein the screening devices include imaging systems comprising sensors for inspecting the items at the screening locations and wherein inputs received through the sensors are transformed into scanning data for display on workstations located at the screening locations; and
   a server device that includes a processor and a non-transitory storage device that stores instructions which cause the processor to:
   receive a first set of selections for creating expert groups, wherein each of the expert groups defines a set of experts equipped to manage potential security threats;
   receive a second set of selections for creating dialing plans that are used to route requests received from the workstations at the screening locations to the expert groups, wherein each dialing plan specifies a sequential ordering of expert groups for handling requests originating from the screening locations;
   store data that associates at least one of the dialing plans with at least one of the screening locations;
   in response to receiving a request submitted by an operator located at one of the screening locations, retrieve a dialing plan associated with that screening location;
   select an expert group identified in the retrieved dialing plan to receive the request based, at least in part, on the sequential ordering of expert groups specified in the retrieved dialing plan;
   establish a connection between the operator and an expert in the selected expert group in response to the request being accepted by the expert;

transmit the transformed screening data to the expert for assistance in resolving the request;
receive an assistance request from the expert in the selected expert group for requesting assistance from a second remote expert in resolving the request submitted by the operator;
establish a second connection between the expert and a second remote expert in response to the second remote expert accepting the assistance request; and
transmit the transformed scanning data to the second remote expert to permit the second remote expert to provide assistance with resolving the request;
wherein communications between the expert and the second remote expert via the second connection are private and are not visible to the operator on the operator's workstation.

2. The system of claim 1, wherein the system utilizes a three tier approach to handle the potential security threats that includes:
   a first security tier that utilizes the at least one canine detection unit to inspect the items at the screening location with the one or more canines;
   a second security tier that utilizes the screening devices to inspect a subset of the items that are identified by the at least one canine detection unit as the raising potential security concerns; and
   a third security tier that utilizes the connection with the expert or the second connection with the second remote expert to resolve the potential security concerns.

3. The system of claim 1, wherein the one or more handlers associated with the at least one canine detection unit are equipped with a mobile device for alerting individuals of the potential security concerns that are identified by the one or more canines.

4. The system of claim 1, wherein the at least one canine detection unit includes teams of canines and handlers that are certified to detect explosives or narcotics, and the at least one canine detection unit is utilized to inspect packages that are being loaded onto or unloaded from a truck, boat or plane.

5. The system of claim 1, wherein the server device stores status information for monitoring the expert groups, and the status information for the selected expert group is changed to idle when all experts assigned to the selected expert group fail to accept a request.

6. The system of claim 5, wherein future requests received from the screening location associated with the retrieved dialing plan are not transmitted to the selected expert group while the status information indicates that the selected expert group is idle, and the server device processor is caused to select another expert group identified in the dialing plan to receive the request based, at least in part, on the sequential ordering in the retrieved dialing plan.

7. The system of claim 1, wherein each one of the dialing plans includes separate sequential orderings for different types of requests such that a first sequential ordering is used to route threat assessment requests to expert groups identified in the dialing plan and a second sequential ordering is used to route testing or calibration requests to expert groups identified in the dialing plan, and the first sequential ordering is different from the second sequential ordering.

8. The system of claim 1, wherein each one of the dialing plans identifies a plurality of expert groups and the sequential ordering is used to determine an order in which the identified expert groups will receive requests originating from a screening location associated with the dialing plan.

9. The system of claim 1, wherein the instructions further cause the processor to:
   monitor status information for the expert groups that indicates whether the experts groups are idle or active; and
   automatically transmit notifications to an operations center when expert groups are designated as idle.

10. The system of claim 1, wherein the server device is configured to provide admin tools that provide interfaces for receiving the first set of selections that are used to create the expert groups, receiving the second set of selections that are used to create the dialing plans, and associating the dialing plans with the screening locations.

11. A method for detecting security threats, the method comprising:
    inspecting items at a screening location to detect potential security concerns with a canine detection unit comprising one or more canines and one or more handlers;
    in response to the canine detection unit determining that an item raises a potential security concern, inspecting the item with a screening device located at the screen location, wherein the screening device includes an imaging system comprising sensors for inspecting the item and wherein inputs received through the sensors are transformed into scanning data for display on a workstation located at the screening location; and
    creating a session with an expert over a network to resolve the potential security concern, wherein creating a session with an expert over a network includes:
       receiving, at a server device, a first set of selections for creating expert groups, wherein each of the expert groups defines a set of experts equipped to manage security threats;
       receiving, at the server device, a second set of selections for creating a dialing plan that is utilized to route requests received from the workstation at the screening location to the expert groups, wherein the dialing plan specifies a sequential ordering of expert groups for handling requests originating from the screening location;
       storing data that associates the dialing plan with the screening location;
       in response to receiving a request submitted by an operator utilizing the workstation, retrieving the dialing plan associated with the screening location;
       selecting an expert group identified in the retrieved dialing plan to receive the request based, at least in part, on the sequential ordering of expert groups specified in the retrieved dialing plan;
       establishing a connection between the operator and the expert in the selected expert group in response to the request being accepted by the expert;
       transmitting the transformed screening data to the expert for assistance in resolving the request;
       receiving an assistance request from the expert in the selected expert group for requesting assistance from a second remote expert in resolving the request submitted by the operator;
       establishing a second connection between the expert and the second remote expert in response to the second remote expert accepting the assistance request; and
       transmitting the transformed scanning data to the second remote expert to permit the second remote expert to provide assistance with resolving the request;

wherein communications between the expert and the second remote expert via the second connection are private and are not visible to the operator on the workstation.

12. The method of claim 11, wherein the method utilizes a three tier approach to handle the potential security concerns which includes:
   implementing a first security tier that utilizes the canine detection unit to inspect the items at the screening location with the one or more canines;
   implementing a second security tier that utilizes the screening device to inspect the item identified by the canine detection unit as raising the potential security concern; and
   implementing a third security tier that utilizes the connection with the expert or the second connection with the second remote expert to resolve the potential security concern.

13. The method of claim 11, wherein the one or more handlers associated with the canine detection unit are equipped with a mobile device for alerting individuals of the potential security concerns that are identified by the one or more canines.

14. The method of claim 11, wherein the canine detection unit includes teams of canines and handlers that are certified to detect explosives or narcotics, and the canine detection unit is utilized to inspect packages that are being loaded onto or unloaded from a truck, boat or plane.

15. The method of claim 11, wherein the server device stores status information for monitoring the expert groups, and the status information for the selected expert group is changed to idle when all experts assigned to the selected expert group fail to accept a request.

16. The method of claim 15, wherein future requests received from the screening location associated with the retrieved dialing plan are not transmitted to the selected expert group while the status information indicates that the selected expert group is idle, and the another expert group identified in the dialing plan is selected to receive the request based, at least in part, on the sequential ordering in the retrieved dialing plan.

17. The method of claim 11, wherein each one of the dialing plans includes separate sequential orderings for different types of requests such that a first sequential ordering is used to route threat assessment requests to expert groups identified in the dialing plan and a second sequential ordering is used to route testing or calibration requests to expert groups identified in the dialing plan, and the first sequential ordering is different from the second sequential ordering.

18. The method of claim 11, wherein each one of the dialing plans identifies a plurality of expert groups and the sequential ordering is used to determine an order in which the identified expert groups will receive requests originating from the screening location associated with the dialing plan.

19. The method of claim 11, wherein the instructions further cause the processor to:
   monitor status information for the expert groups that indicates whether the experts groups are idle or active; and
   automatically transmit notifications to an operations center when expert groups are designated as idle.

20. A method for detecting security threats, the method comprising:
   receiving an indication that a canine detection unit has detected an item that raises a potential security concern at a screening location;
   inspecting the item with a screening device located at the screen location in response to the received indication, wherein the screening device includes an imaging system comprising sensors for inspecting the item and wherein inputs received through the sensors are transformed into scanning data for display on a workstation located at the screening location; and
   initiating a request for a session with an expert over a network to resolve the potential security concern, wherein the session creation comprises:
      receiving, at a server device, a first set of selections for creating expert groups, wherein each of the expert groups defines a set of experts equipped to manage security threats;
      receiving, at the server device, a second set of selections for creating a dialing plan that is utilized to route requests received from the workstation at the screening location to the expert groups, wherein the dialing plan specifies a sequential ordering of expert groups for handling requests originating from the screening location;
      storing data that associates the dialing plan with the screening location;
      in response to receiving a request submitted by an operator utilizing the workstation, retrieving the dialing plan associated with the screening location;
      selecting an expert group identified in the retrieved dialing plan to receive the request based, at least in part, on the sequential ordering of expert groups specified in the retrieved dialing plan;
      establishing a connection between the operator and the expert in the selected expert group in response to the request being accepted by the expert;
      transmitting the transformed screening data to the expert for assistance in resolving the request;
      receiving an assistance request from the expert in the selected expert group for requesting assistance from a second remote expert in resolving the request submitted by the operator;
      establishing a second connection between the expert and the second remote expert in response to the second remote expert accepting the assistance request; and
      transmitting the transformed scanning data to the second remote expert to permit the second remote expert to provide assistance with resolving the request;
      wherein communications between the expert and the second remote expert via the second connection are private and are not visible to the operator on the workstation.

21. The method of claim 20, wherein the indication is provided by a mobile device operated a handler associated with the canine detection unit.

* * * * *